MULTIPLE INPUT BINARY ADDER-SUBTRACTERS

Filed Nov. 25, 1953 3 Sheets-Sheet 1

INVENTORS.
JOHN V. BLANKENBAKER,
BY ROBERT ROYCE JOHNSON,
Lester S. Hecht
THEIR ATTORNEY.

MULTIPLE INPUT BINARY ADDER-SUBTRACTERS

Filed Nov. 25, 1953 3 Sheets-Sheet 2

INVENTORS.
JOHN V. BLANKENBAKER,
BY ROBERT ROYCE JOHNSON,
Lester S. Hecht
THEIR ATTORNEY.

MULTIPLE INPUT BINARY ADDER-SUBTRACTERS

Filed Nov. 25, 1953

JOHN V. BLANKENBAKER
ROBERT ROYCE JOHNSON
INVENTORS

BY Henry Heyman
ATTORNEY

United States Patent Office 2,888,202
Patented May 26, 1959

2,888,202

MULTIPLE INPUT BINARY ADDER-SUBTRACTERS

John V. Blankenbaker, Albany, Oreg., and Robert Royce Johnson, Pasadena, Calif., assignors, by mesne assignments, to Hughes Aircraft Company, a corporation of Delaware Application November 25, 1953, Serial No. 394,296

33 Claims. (Cl. 235—176)

This invention relates to multiple input binary adder-subtracters and, more particularly, to multiple input binary adder-subtracters wherein a plurality of input signal series respectively representing the binary numbers to be combined in addition or subtraction are translated into a series of sets of weighted signals in a predetermined binary code, the weighted signals being then utilized to define a series of sets of weighted carry signals and a binary result series.

The present invention provides an extension of the principles introduced in copending U.S. patent application, Serial No. 378,116, for "Multiple Input Binary-Coded Decimal Adders and Subtracters," by John V. Blankenbaker, filed September 2, 1953. In the copending application a novel three-input adder is described wherein three input binary signal series $X_j$, $A_j$, and $B_j$ are each received in the order of least significant binary digit signal first and most significant binary digit signal last, and wherein the corresponding binary digit signals of each series are simultaneously received and added, $j$ representing the binary digit positions in the respective signal series. As is fully explained in the copending application, the input signal series are translated into a series of sets of signals $F_j^{1,3}$ and $F_j^{2,3}$ indicating respectively the presence of one or three 1-representing binary signals in binary position $j$ of the input signal series, and the presence of two or three 1-representing binary signals in binary position $j$ of the input signal series. The binary sum is then formed by effectively adding the signal series $F_j^{1,3}$ to the series $F_{j-1}^{2,3}$, the signal series $F_{j-1}^{2,3}$ corresponding to the series $F_j^{2,3}$ delayed one binary time interval. As indicated in the copending application, a similar technique of binary adding may be utilized for greater numbers of input signals, a four-input adder being specifically described.

According to the present invention any combination of additions and subtractions of multiple binary input signals representing corresponding binary input numbers may be performed in a manner somewhat similar to that described in the copending application. In general, the technique provided by the present invention is to consider or treat each of the input signals as having a significance of either +1 or —1 depending upon whether the corresponding binary input number is to be added or subtracted. The input signals are then translated to a set of intermediate or weighted signals which indicate the aggregate significance of the input signals in accordance with a predetermined binary code. From the set of intermediate signals, carry signals are formed which are combined with the intermediate signals to produce a result signal series indicating the result as a binary output number. Thus each input signal is evaluated or assigned, by an evaluational or translation circuit, a significance or value of +1 or —1 irrespective of the true binary weight of the input signal. Intermediate or evaluational signals are then developed which represent the total or aggregate significance or value of the input signals. Carry signals, which are developed from the intermediate or evaluational signals, are then combined with the intermediate signals to form output signals representing a desired binary output number.

As will become apparent from the ensuing description, the techniques provided by the present invention are readily applicable for use in any numbering system employing binary digit signals to represent magnitudes or quantities in accordance with a selected code, examples of such systems being conventional binary, binary-coded decimal and binary-coded octal numbering systems. In order to facilitate a clear and concise description of the present invention, however, it is assumed at the outset that the multiple-input binary adder-subtracter of the present invention is adapted to operate in a conventional binary numbering system. A conventional binary numbering system may be defined as a numbering system wherein a magntiude or quantity is represented by a group of binary digits having weights of powers of 2, each binary digit of the group having a weight double that of the immediately lesser order binary digit and one-half that of the immediately greater order binary digit. It is further assumed that each binary signal series or group of binary digit signals is received by the multiple-input binary adder-subtracter of the present invention in the order of least significant binary digit signal first and most significant binary digit last. Thus a binary digit signal delayed one binary digit place and represented by a symbol accompanied by a subscript $j$—1 will have a weight or significance one-half that of a presently received corresponding signal represented by the same symbol but accompanied by the subscript $j$.

In subtracting a relatively large quantity from a relatively small quantity, the difference or result represents a negative quantity. In accordance with the conventions utilized to illustrate the present invention, a negative quantity is represented by its complement expressed in the true binary numbering system.

In a three-input multiple adder-subtracter, according to the present invention, where the operation $X_j-A_j-B_j$ is to be performed, the input signals $X_j$, $A_j$, and $B_j$ are considered as having a significance or weight of +1, —1, and —1, respectively, and are translated to the set of intermediate signals $F_j^{-2}$ and $F_j^{+1}$ having a significance or weight of —2 and +1, respectively. The desired binary result is then formed by effectively subtracting the signal $F_{j-1}^{-2}$ from signal $F_j^{+1}$. A somewhat similar adder-subtracter, according to the invention, is one for performing the operation $X_j+A_j-B_j$; $X_j$, $A_j$ and $B_j$ being given the weights of +1, +1, and —1, respectively, and being translated to the set of intermediate or weighted signals $F_j^{+2}$ and $F_j^{-1}$ having weights of +2 and —1. The desired binary result is then formulated by subtracting the signal $F_j^{-1}$ from the signal $F_{j-1}^{+2}$.

The principles of the present invention may be extended to any number of input signals, one illustration being a four-input adder-subtracter where the operation $$X_j+A_j-B_j-Y_j$$

is performed. In this multiple adder-subtracter the signals $F_{j-1}^{+2}$ ($X_j$, $A_j$, $B_j$) and $F_j^{-1}$ ($X_j$, $A_j$, $B_j$) are formed first and the operation is completed by combining signals $F_{j-1}^{+2}$, $F_j^{-1}$, and $Y_j$ as three input signals having the weights of +1, —1, and —1, respectively.

Where it is desired to perform any of several addition and substraction operations, the weighted translation functions may be defined so that at least one function is common to all operations. Thus, the weighted signals $F_j^{+1}$, $F_j^{-1}$, and $F_j^{+1}$ required for the operation of: $X_j+A_j+B_j$; $X_j+A_j-B_j$; and $X_j-A_j-B_j$, respectively, may all be defined as the function $F_j^{\,1,3}(X_j, A_j, B_j)$ indicating that one or three of the corresponding ±1-representing binary variables are present. Thus, any of a combination of binary operations may be performed with a minimum of additional circuit elements being required.

As pointed out in the above-mentioned copending application, binary adders utilizing an addition principle equivalent to the combination addition-subtraction principle of the present invention are particularly useful in multiple input binary-coded decimal adder-subtracters wherein the binary result, whether sum or difference, must be corrected to the desired binary-coded decimal result. In a similar manner the binary multiple adder-subtracters of the present invention are particularly useful in binary-coded decimal operations equivalent to the type of binary operations described above. Several forms of correction circuits suitable for use with the multiple binary adder-subtracters of the present invention in binary-coded decimal arithmetic units are described in copending U.S. patent application Serial No. 378,116 for "Multiple Input Binary-Coded Decimal Adders and Subtractors," by John V. Blankenbaker, filed September 2, 1953.

Accordingly it is an object of the present invention to provide a multiple input binary adder-subtracter wherein any of a plurality of addition or subtraction operations may be performed with a minimum of circuit elements.

Another object is to provide a multiple input binary adder-subtracter which may be utilized efficiently in a binary-coded decimal arithmetic unit, where the combination of binary sums or differences of a plurality of binary-coded decimal input numbers must be corrected to the desired binary-coded decimal result.

A further object is to provide a multiple input binary adder-subtracter wherein a plurality of input signal series respectively representing the binary numbers to be combined in addition or subtraction are translated into a series of sets of weighted signals in a predetermined binary code, the weighted signals being then utilized to define a series of sets of carry signals and the binary result series.

Still another object is to provide a three-input adder-subtracter for performing the operation: $X_j-A_j-B_j$.

Yet a further object is to provide a three-input adder-subtracter for performing the operation: $X_j+A_j-B_j$.

Yet another object is to provide a four-input adder-subtracter for performing the operation: $X_j+A_j-B_j-Y_j$.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only and are not intended as a definition of the limits of the invention.

Figure 5:
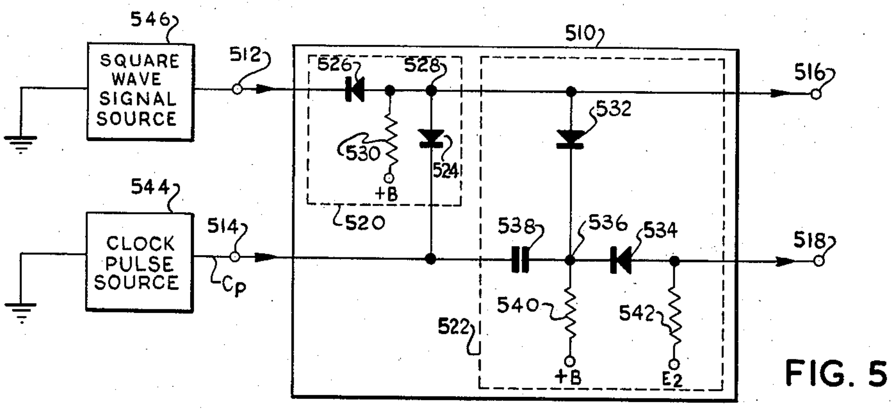
Figure 5A:
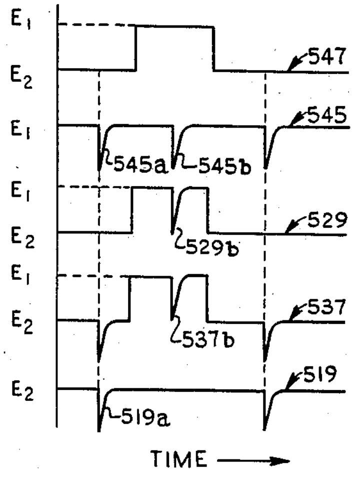

Figs. 5 and 5*a* are a schematic circuit diagram and a voltage wave form chart, respectively, of a typical complementer circuit.

Figure 1:
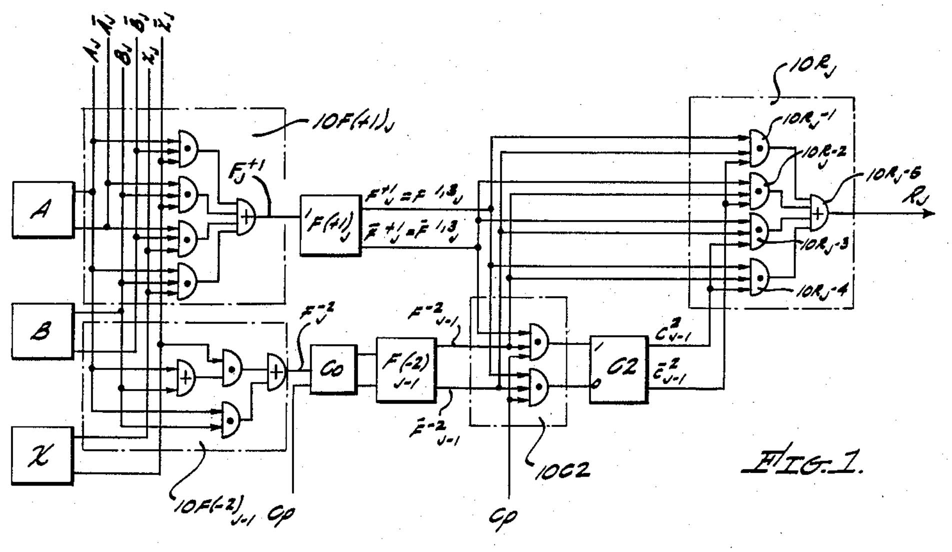
Fig. 1 is a schematic diagram of a 3-input binary adder-subtracter according to the present invention for performing the operation: $X_j-A_j-B_j$.

Reference is now made to Fig. 1 wherein there is shown an adder-subtracter according to the present invention for performing the operation: $X_j-A_j-B_j$. As shown in Fig. 1 the adder-subtracter comprises three input means A, B, and X producing complementary signal series $A_j$, $\bar{A}_j$; $B_j$, $\bar{B}_j$; and $X_j$, $\bar{X}_j$, respectively corresponding to the binary digits and complements of three binary input numbers A, B, and X. The signals produced by input means A, B, and X are combined in two gating circuits 10F(+1)*j* and 10F(−2)*j*−1 to form a series of sets of intermediate or translation signals $F_j^{+1}$ and $F_j^{-2}$ having weights defined in accordance with a predetermined binary code of +1 and −2 respectively, and representing all possible aggregate weights of the input signals A, B, and X considered as having a significance or weight of −1, −1, and +1, respectively.

In order to avoid possible confusion, it should be understood at the outset that a binary signal or binary variable represented by a symbol with a bar (¯) over the symbol indicates the complement of the signal or variable. More specifically, a binary signal represented by a symbol with a bar (¯) over the symbol is at all times at the opposite voltage level as a signal represented by the same symbol without the bar (¯). Thus in accordance with the convention employed herein, a binary 1 digit is represented by a relatively high voltage level signal and a binary 0 digit by a relatively low voltage level signal. Therefore the complements of these signals, represented by a barred (¯) symbol, have relatively low voltage levels for binary 1 digits and relatively high voltage levels for binary 0 digits. As a specific example, a binary 1 digit is represented by a relatively high and a relatively low $A_j$ and $\bar{A}_j$ signal, respectively.

The signals $F_j^{+1}$ are converted into corresponding complementary signals $F_j^{+1}$ and $\bar{F}_j^{+1}$ through a direct-current triggered circuit F(+1)*j*. The signals $F_j^{-2}$ are utilized as first carry signals $C_j^1$ and are delayed and complemented through a pulse complementer circuit C*o* and flip-flop F(−2)*j*−1 producing corresponding output signals $F_{j-1}^{-2}$ and $\bar{F}_{j-1}^{-2}$.

A second carry signal series $C_j^2$ is formed by effectively subtracting the carry series $F_{j-1}^{-2}=C_{j-1}^1$ from signals $F_j^{+1}$; carry series $C_j^2$ being formed through a carry gating circuit 10C2. The carry series $C_j^2$ is then delayed and complemented producing signals $\bar{C}_{j-1}^2$, and $C_{j-1}^2$ through a flip-flop C2 controlled by gating circuit 10C2. A result signal series $R_j$ is then formed as a function of signal series $F_j^{+1}$, $F_{j-1}^{-2}$ and $C_{j-1}^2$ and their corresponding complements in a result-forming matrix 10R*j*.

The flip-flops utilized may be conventional flip-flops having 1 and 0 input circuits such that signals applied separately to the 1 and 0 input circuits set the flip-flop to stable states representing binary 1 and 0, respectively, and the simultaneous application of signals to both input circuits triggers the flip-flop or causes it to change stable states.

A typical flip-flop circuit of the above class suitable for use in the adder-substracter of Fig. 1 is fully illustrated and described in detail in U.S. Patent No. 2,644,887 entitled "Synchronizing Generator," by A. E. Wolfe, Jr., issued July 7, 1953.

As indicated in Fig. 1, clock pulses C*p* are applied to complementer C*o* and gate 10C2. The clock or trigger pulses C*p* are orderly, equally spaced pulses which are externally generated and applied to the adder-subtracter circuit of Fig. 1, for synchronizing or timing the operation of the flip-flop circuits F(−2)*j*−1 and C2. Although the stable states assumed by each of the flip-flops F(−2)*j*−1 and C2 are regulated or controlled by signals generated by a corresponding gating circuit, as above indicated, this is actually accomplished by selectively gating clock pulses C*p* to the flip-flop by the corresponding gating circuit, the clock pulse C*p* actually triggering the flip-flop. This will become more apparent in the ensuing description.

Figure 4:
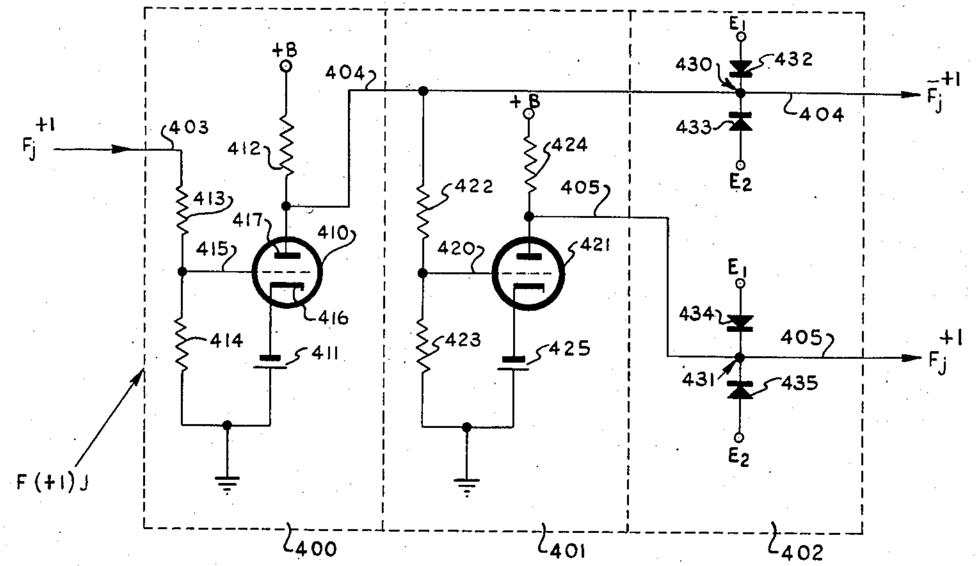
Fig. 4 is a schematic circuit diagram of a direct current trigger circuit.

Direct-current trigger circuit (F+1)*j* may be any of the well-known types of circuits used in the electronic art for receiving two-level or binary input signals and producing a reproduction of these input signals on a first output and the complement of the input signals on a second output. A preferred direct-current trigger circuit of this class is illustrated in Fig. 4. A suitable type of complementer circuit *Co* for providing pulse input signals for the 1 and 0 input circuits of flip-flop F(−2)*j*−1 in response to an applied voltage-level or binary signal is illustrated in Fig. 5. Before considering in more detail the operation of the adder-subtracter of Fig. 1, and the detailed structure of the gating circuits 10F(+1)*j*, 10F(−2)*j*−1, 10C2, and 10R*j*, it is considered advantageous at this time to consider in more detail the structure and operation of the direct-current trigger circuit F(+1)*j*, and the complementer circuit *Co*.

Referring to Fig. 4, there is presented a schematic circuit diagram F(+1)*j* indicated by broken lines of a preferred embodiment of the direct-current trigger F(+1)*j* of Fig. 1, for receiving input signals $F_j^{+1}$ on an input lead 403 and for producing complementary output signals $\bar{F}_j^{+1}$ and $F_j^{+1}$ on output leads 404 and 405, respectively. The direct current trigger F(+1)*j* includes a first direct current (D.C.) amplifier 400, a second direct current (D.C.) amplifier 401, and a clamping circuit 402, each indicated by broken lines. The first D.C. amplifier 400 is responsive to input signals $F_j^{+1}$ on lead 403 for producing output signals $\bar{F}_j^{+1}$ on lead 404, signals $\bar{F}_j^{+1}$ being the complement of input signals $F_j^{+1}$. The second D.C. amplifier 401 is coupled to the first D.C. amplifier 400 and responsive to signals $\bar{F}_j^{+1}$ produced by D.C. amplifier 400 for developing signals $F_j^{+1}$ on output lead 405. The signals $F_j^{+1}$ are signals having the same phase and voltage amplitude but a greater power capacity than the input signals $F_j^{+1}$ input, i.e., are developed from a lower impedance source. Therefore, from a voltage standpoint, output signals $F_j^{+1}$ on lead 405 are a reproduction of input signals $F_j^{+1}$ on lead 403, and output signals $\bar{F}_j^{+1}$ are complementary signals of input signals $F_j^{+1}$.

The clamping circuit 402 is coupled to the first D.C. amplifier 400 and the second D.C. amplifier 401 for receiving complementary output signals $F_j^{+1}$ and $\bar{F}_j^{+1}$ on leads 405 and 404, respectively, and for clamping the voltage level swings of signals $F_j^{+1}$ and $\bar{F}_j^{+1}$ within the same limits as the voltage level swings of input signals $F_j^{+1}$.

D.C. amplifier 400 is a conventional direct current amplifier circuit and includes a triode 410, a plate load resistor 412, a biasing battery 411, and an input voltage divider circuit comprised of resistors 413 and 414 in series. The input signals $F_j^{+1}$ appearing on lead 403 are applied to the upper extremity of the voltage divider circuit, the lower extremity of which is connected to ground. The common junction point of resistors 413 and 414 is connected to the control grid 415 of triode 410, thus by the proper choice of resistance values for resistors 413 and 414, the input signals $F_j^{+1}$ on lead 403 may be reduced to convenient voltage level swings for application to control grid 415. The cathode 416 of tube 410 is returned to ground through the biasing battery 411 thus supplying a convenient grid-cathode bias on tube 410. The anode 417 of tube 410 is coupled to a B+ supply through the load resistance 412. The output lead 404 is directly coupled to the anode 417 of tube 410, thus the output signals $\bar{F}_j^{+1}$ on lead 404 are developed as the output signals of the D.C. amplifier 400 developed by the load resistor 412.

D.C. amplifier 401 is substantially identical to D.C. amplifier 400 above described in that signals $\bar{F}_j^{+1}$ developed by amplifier 400 on lead 404 are applied to a control grid 420 of a triode tube 421 through an input voltage divider circuit comprised of resistors 422 and 423 connected in series between the input lead 404 and ground. The cathode of tube 421 is maintained at a potential positive in relation to the control grid 420 by a bias battery 425. The anode of tube 421 is supplied with a B+ supply through a load resistor 424. The output lead 405 is connected directly to the anode of tube 421 and thus signals $F_j^{+1}$ appearing on lead 405 are developed as the output signals of D.C. amplifier 401.

Direct current amplifiers of the above described class are fully described in "Electronics Experimental Techniques," by William C. Elmore and Mathew Sands, published by McGraw-Hill Book Company, Inc., 1949, pages 180 to 183.

The clamping circuit 402 includes a first diode clamp 430 and a second diode clamp 431. Diode clamp 430 is coupled to output lead 404 for clamping output signals $\bar{F}_j^{+1}$ within the limits between two direct-current voltage values $E_1$ and $E_2$ impressed on clamp 430, and diode clamp 431 is coupled to lead 405 for maintaining signals $F_j^{+1}$ appearing on lead 405 within the same limits in response to the voltages $E_1$ and $E_2$ impressed thereon. Diode clamp 430 includes a first diode 432 having its anode connected to the voltage $E_1$, and diode 433 having its cathode connected to voltage $E_2$, the cathode of diode 432 and the anode of diode 433 being connected commonly to the output lead 404. Thus diode clamp 430 operates as a clamping circuit for clamping the signals appearing on lead 404 below the amplitude of voltage $E_1$ and above the amplitude of voltage $E_2$. Diodes 434 and 435 of the diode clamp 431 are similarly connected to the voltages $E_1$ and $E_2$ and the output lead 405 and similarly clamp signals $F_j^{1,3}$ appearing on lead 405 below voltage $E_1$ and above voltage $E_2$. Voltages $E_1$ and $E_2$ are chosen to correspond to the upper and lower limits, respectively, of the binary or two-level voltage input signals $F_j^{+1}$ appearing on lead 403. Clamping circuits of this class are fully discussed in "Electronics Experimental Techniques," by William C. Elmore and Mathew Sands, published by McGraw-Hill Book Company, Inc., 1949, pages 114 to 117.

Reference is now made to Fig. 5 wherein there is presented a typical complementer or complementary signal generating network circuit 510 adapted for operation as the complementer circuit *Co* of Fig. 1. The complementary signal generator network 510 is responsive to binary or two-level voltage control signals applied at a first input terminal 512 for selectively gating or passing an electrical pulse or clock signal *Cp* applied at a second input terminal 514 to produce two complementary electrical pulse output signals at a first output terminal 516 and a second output terminal 518, respectively. More specifically, the complementer circuit 510 is adapted to effectively gate the input clock pulses *Cp* to the first output terminal 516 when the binary control signals at terminal 512 have a relatively high or 1-representing value, and to the second output terminal 518 when the control signals at terminal 512 have a relatively low or 0-representing value.

Complementary signal generating network 510 includes first and second electronic gating circuits 520 and 522, respectively, responsive to different predetermined voltage levels of the applied control signal for selectively presenting the applied electrical pulse signal at output terminals 516 and 518, respectively. First gating circuit 520 includes a pair of unidirectional current devices, such as crystal diodes 524 and 526, the cathode of diode 524 being connected to input terminal 514 and the cathode of diode 526 being connected to control terminal 512. Diodes 524 and 526 have their anodes connected together at a common junction 528 which is connected to output terminal 516. Common junction 528 is also coupled to one terminal B+ of a source of biasing potential, not shown, by a biasing resistor 530, the other terminal of the source being grounded.

Second gating circuit 522 also includes a pair of serially connected unidirectional current devices, such as crystal diodes 532 and 534, interconnecting common junction 528 with output terminal 518, the cathode of diode 532 being connected to common junction 528 and the anode of diode 534 being connected to output terminal 518. The common junction 536 of diodes 532 and 534 is in turn coupled to input terminal 514 by a capacitor 538 and to one terminal B+ of the source of biasing potential, not shown, by a biasing resistor 540. In a similar manner, diode 534 has its anode coupled to one terminal $E_2$ of a source of biasing potential, not shown, by a biasing resistor 542. The other terminal of each of the sources is connected to ground. The function of the biasing potentials at terminals B+ and $E_2$ and typical values thereof will be described in detail below. For reasons which will become more clearly understood later, however, it should be stated that the potential appearing at terminal $E_2$ is lower than the potential at terminal B+.

In operation, input terminal 514 is connected to a source 544 of negative electrical clock pulses *Cp* to be selectively passed, and control terminal 512 is connected to a variable potential control or binary signal source, such as a squarewave signal source 546 which controls the selectivity of gating circuits 520 and 522. Source 546 may be any suitable source of a signal having alternate relatively high and relatively low voltage levels, such as a conventional voltage state gating matrix. For example in Fig. 1, the gating matrix 10F(−2)*j*−1 is substituted for the square wave signal source 546 of Fig. 5.

Referring now to Fig. 5*a*, there is shown a composite diagram of the waveforms appearing at various points in the complementary signal generating network of Fig. 5. The control signal, generally designated 547, which is applied to control terminal 512 from source 546, includes alternate relatively low and high voltage levels $E_2$ and $E_1$, respectively, the voltage level $E_2$ corresponding substantially to the biasing potential at terminal $E_2$. The negative electrical pulse or clock signal *Cp*, generally designated 545, which is applied to input terminal 514 from source 544, has a steady state voltage level which is preferably substantially equal to potential $E_1$, the periodically recurring negative pulse excursions of signal 545 lowering the potential of the signal accordingly.

Figure 2:
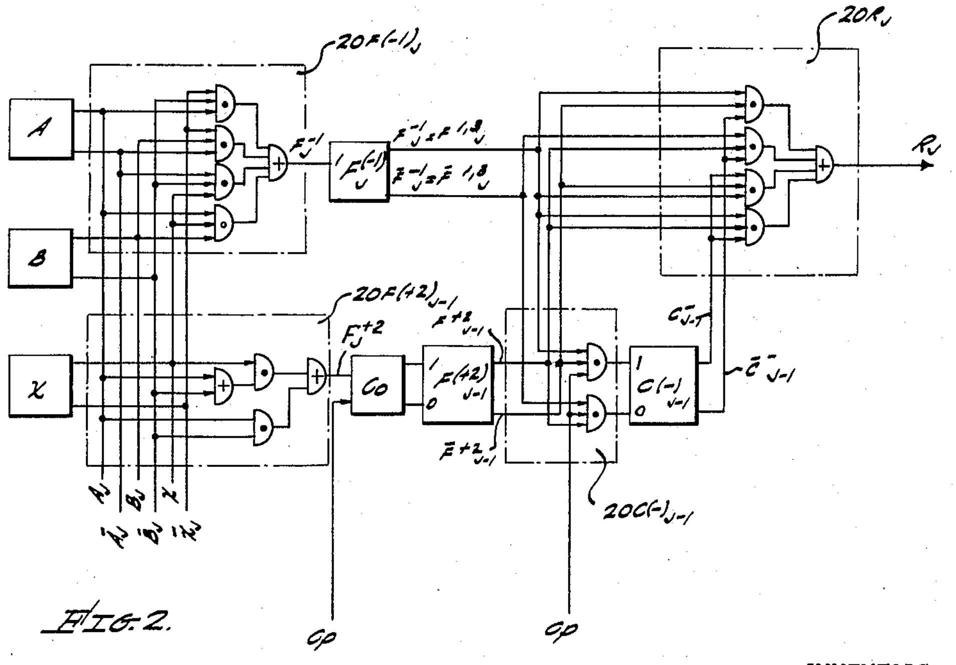
Fig. 2 is a schematic diagram of another form of 3-input adder-subtractor according to the present invention for performing the operation: $X_j+A_j-B_j$.

Assume now that signal 547 is initially at its low potential value of $E_2$, as shown at time $t_0$ in Fig. 2. Under these conditions the signal, generally designated 529, appearing at common junction 528 will be at a voltage level substantially equal to level $E_2$ due to the clamping action of diode 526. In a similar manner, the signal, generally designated as 537 appearing at common junction 536, will have a potential value substantially equal to $E_2$ due to the clamping action of diode 532. Consequently, the potential difference across diode 534 in second gating circuit 522 is substantially zero volts, whereas diode 524 in first gating circuit 520 is back-biased by substantially the voltage differential between the voltage levels $E_1$ and $E_2$.

Consider now the behavior of complementary signal generating network 510 when signal 545 includes a first negative pulse 545*a*, the pulse amplitude being equal to or less than the voltage differential between voltage levels $E_1$ and $E_2$. Since the amplitude of pulse 545*a* is insufficient to drive the cathode of diode 524 below voltage level $E_2$, it is apparent that diode 524 will remain back-biased. Accordingly, diode 524 will not pass the negative pulse to common junction 528 and hence to output terminal 516.

When negative pulse 545*a* is applied to input terminal 514, the potential of common junction 536, heretofore clamped substantially at level $E_2$ by diode 532, will be lowered accordingly, due to the coupling action of capacitor 538. It is clear, of course, that diode 532 will be immediately back-biased for the duration of pulse 545*a*, since its cathode is held substantially at level $E_2$ due to the clamping action of diode 526, whereas its anode will fall below potential $E_2$ by approximately the amplitude of pulse 545*a*. It follows then, that pulse 545*a* is inhibited from appearing at output terminal 516 by back-biased diodes 524 and 532.

It is clear, however, that diode 534 is now front-biased by the application of pulse 545*a* since the potential of common junction 536 and hence the cathode of diode 534 is driven below the voltage level $E_2$ by the magnitude of the applied pulse. Accordingly, negative pulse 545*a* will be passed by diode 534 and will result in a corresponding negative pulse 519*a* in the signal, generally designated 519, which appears at output terminal 518.

Assume now that signal 547 swings to its relatively high level potential value $E_1$, and that signal 545 is at its steady state level $E_1$. Under these conditions, the potentials at common junctions 528 and 536 also swing to voltage level $E_1$ due to the clamping action of diodes 526 and 532, respectively. Consequently, the potential difference across diode 524 in first gating circuit 520 is substantially zero, whereas diode 534 in second gating circuit 522 is back-biased by substantially the voltage differential between the voltage levels $E_1$ and $E_2$.

Let us now assume that signal 545 includes a negative pulse 545*b*, the amplitude of which is equal to or less than the voltage differential between voltage levels $E_1$ and $E_2$. It is immediately clear that diode 524 will be front-biased and will, therefore, pass pulse 545*b* and produce a corresponding output pulse 529*b* in signal 529 appearing at output terminal 516.

Although pulse 545*b* is also applied to common junction 536 by coupling capacitor 538, it will be noted that the pulse 537*b* appearing in signal 537 does not lower the potential of common junction 536 below potential level $E_2$. Accordingly, diode 534 will remain back-biased and thereby inhibit the applied negative electrical pulse from appearing at output terminal 518.

If signal 547 applied to control terminal 512 of complementary signal generating network 510 again swings to its low potential value of $E_2$ as illustrated in Fig. 2, a negative pulse 545*c* applied to input terminal 514 will again produce a corresponding negative pulse 519*c* at output terminal 518 and will be inhibited from appearing in signal 529 at output terminal 516. It is clear, therefore, that complementary signal generating network 510 is responsive to the relatively high and relatively low potential levels of control signal 547 for selectively passing negative electrical pulses applied at input terminal 512 to produce two complementary output signals at output terminals 516 and 518, respectively. In other words, an applied electrical pulse signal will be presented at either output terminal 516 or at output terminal 518 depending upon whether control signal 547 is at its relatively high potential value or its relatively low potential value, respectively.

As set forth above, diode 526 and resistor 530 are utilized for clamping common junction 528 at substantially the instantaneous voltage of control signal 547. However, diode 526 also performs the additional function of inhibiting electrical pulses appearing at junction 528, such as pulse 529*b* in signal 529, from being applied back into squarewave signal source 546. For example, when electrical pulse 545*b* is applied at input terminal 514, the potential of common junction 528 drops below its clamped potential level $E_1$ by the voltage amplitude of pulse 529*b*. Since the potential $E_1$ is being applied to the cathode of diode 526 at this time, diode 526 is back-biased for the duration of pulse 529*b*, thereby effectively isolating source 546 from clock pulse source 544. The combination of diode 526 and resistor 530 may, therefore, be termed an isolating network.

It will be recognized by those skilled in the computer art that if squarewave signal source 546 comprises a voltage state gating matrix having a conventional diode "and" gate output circuit, the isolating network including diode 526 and resistor 530 may be eliminated from complementary signal generating network 510. In other words, if squarewave signal source 546 includes an "and" gate output circuit, the function of diode 526 and resistor 530 may be performed by the output circuit of the source, and the isolating network may be excluded from complementary signal generating network 510.

The above described complementer or complementary signal generator is fully described and claimed in copending U.S. patent application, Serial No. 308,045, for "Complementary Signal Generating Network," by Daniel L. Curtis, filed September 5, 1952, now Patent No. 2,812,451.

The structure of certain gating circuits such as 10F(+1)*j*, 10C2, and 10R*j* is defined according to certain Boolean algebraic equations which specify the sequences of stable states of the corresponding flip-flops and trigger circuit. Logical Boolean algebraic equations will be frequently employed in this discussion for expressing variables as well as explaining the mechanization of certain gating circuits employing logical "and" and "or" circuits or gates which correspond directly to symbols of the logical equations. The logical "and" and "or" circuits and their correspondence to symbols utilized in the logical equations are explained in appropriate sections of the ensuing description. Before considering the specific mechanization of the gating circuits, therefore, it is essential, for a complete understanding of the invention, to consider the basic algebraic equations defining them. It will be noted that the variables used in the following equations correspond to the electrical signals indicated in Fig. 1, so that each equation may be considered to define an electrical function of the corresponding gating circuit. After the derivation of each equation is completed the equation is given a number corresponding to the gating circuit which it defined. Equation 10F(+1)*j* for example, defines gating circuit 10F(+1)*j*.

In performing the operation $X_j-A_j-B_j$ it is apparent that the range of the aggregate weight of the input variables without carries being considered is (−2) through +1. The aggregate weight (−2) occurs in any place if binary digits $A_j$ and $B_j$ are 1 and $X_j$ is 0, and the weight +1 occurs when $X_j$ is 1 and both $A_j$ and $B_j$ are 0. This range may be represented by two signals $F_j^{-2}$ and $F_j^{+1}$ having weights of −2 and +1 so that the aggregate weight −2 is indicated by a 1-representing signal $F_j^{-2}$ and a 0-representing signal $F_j^{+1}$; and the aggregate weight +1 is indicated by a 0-representing signal $F_j^{-2}$ and a 1-representing signal $F_j^{+1}$. In a similar manner, the signals $F_j^{-2}$ and $F_j^{+1}$ may be defined to represent any of the other input conditions of signals $A_j$, $B_j$, and $X_j$ as indicated in Table I wherein all eight possible input conditions are considered:

*Table I*

| Aggregate Weight $X_jA_jB_j$ | Operation $X_j-A_j-B_j$ | | | | |
|---|---|---|---|---|---|
| | +1 $X_j$ | −1 $A_j$ | −1 $B_j$ | −2 $F_j^{-2}$ | +1 $F_j^{+1}$ |
| (−2) | 0 | 1 | 1 | 1 | 0 |
| (−1) | 0<br>0<br>1 | 0<br>1<br>1 | 1<br>0<br>1 | 1<br>1<br>1 | 1<br>1<br>1 |
| (0) | 0<br>1<br>1 | 0<br>0<br>1 | 0<br>1<br>0 | 0<br>0<br>0 | 0<br>0<br>0 |
| (1) | 1 | 0 | 0 | 0 | 1 |

As indicated in Table I, the variable $F_j^{+1}$ has a 1-representing value whenever one or three of variables $X_j$, $A_j$, and $B_j$ have 1-representing values so that it may be defined by the function:

$$F_j^{+1}=F^{1,3}(A_j, B_j, X_j)$$
$$=A_j.\overline{B}_j.\overline{X}_j+\overline{A}_j.B_j.\overline{X}_j+\overline{A}_j.\overline{B}_j.X_j+A_j.B_j.X_j \quad (1)$$

where the dot (.) is the logical "and" and the plus (+) the logical, inclusive "or." It should be noted in reference to the above logical expression or function for $F_j^{+1}$ that a 1-representing value in the table is indicated in the logical expression by the corresponding symbol of the variable whereas a 0-representing value in the table is represented by a bar (‾) over the corresponding variable symbol. This in consistent with the previously explained significance of the bar (‾) as identifying the complement of a binary variable or signal. Thus when the complement of a variable, as indicated by the bar (‾), has a 1-representing value, it follows that the corresponding variable will have a 0-representing value. This practice is consistently carried out in the remainder of this description, i.e., a 0-representing value of a variable being represented in the associated logical expressions by a symbol superimposed by a bar (‾). Since the function $F^{1,3}$ ($A_j$, $B_j$, $X_j$) appears frequently in considering the embodiments of the invention it is often convenient to utilize it in the place of its equivalent variable $F_j^{+1}$. For simplicity this function may be represented as $F_j^{1,3}$ where it is implied that it is a function of the input signals. The function $G^{1,3}$ ( ) will be utilized to express a one or three function of other functions, and may be identified simply as the variable $G_j^{1,3}$.

In a similar manner the variable $F_j^{-2}$ is found, from Table I, to have a 1-representing value whenever $X_j$ is 0 and either $A_j$ or $B_j$ is 1, or when Both $A_j$ and $B_j$ are 1. This relationship is expressed by the function:

$$F_j^{-2}=\overline{X}_j.(A_j+B_j)+A_j.B_j \quad (2)$$

where the parentheses ( ) indicate the logical "and" function.

The complete weight of the result in any digit position may be represented by variables $F_j^{-2}$ and $F_j^{+1}$ defined above, and two carry variables $C_{j-1}^1$ and $C_{j-1}^2$ having weights of −1 each. It is apparent that the carry signals $C_{j-1}^1$ and $C_{j-1}^2$ each represented a weight of −2 in the corresponding (*j*−1)st binary digital place. The binary place representation *j*−1 is utilized to indicate that the carry variables are brought over from the result in the (*j*−1)st place, where the (*j*−1)st place is the immediately preceding or next lower order binary place as correspond to the (*j*)th place. It is apparent from the foregoing description that the carry variables $C_{j-1}^1$ and $C_{j-1}^2$ correspond to carries $C_j^1$ and $C_j^2$ delayed one binary digit time interval. These variables provide sixteen possibilities of results ranging in weight from −4, corresponding to the situation when $X_j$ is 0 and each of the variables $A_j$, $B_j$, $C_{j-1}^2$, and $C_{j-1}^1$ are 1, to a weight of +1 corresponding to the situation when $X_j$ is 1 and all of the variables $A_j$, $B_j$, $C_{j-1}^2$, and $C_{j-1}^1$ are 0. A complete set of situations is illustrated in Table II below. Table II also illustrates one manner of defining the translation from signal set $F_j^{-2}$, $F_j^{+1}$, $C_{j-1}^2$, and $C_{j-1}^1$ to the set $C_j^2$, and $C_j^1$, and $R_j$ corresponding to the final result and carry digits desired.

*Table II*

| Aggregate Weight $X_jA_jB_jC^2_{j-1}C^1_{j-1}$ | $-2$ $F_j^{-2}$ | $+1$ $F_j^{+1}$ | $-1$ $C^1_{j-1}$ | $-1$ $C^2_{j-1}$ | $-2$ $C^1_j$ | $-2$ $C^2_j$ | $+1$ $R_j$ |
|---|---|---|---|---|---|---|---|
| (−4) | 1 | 0 | 1 | 1 | 1 | 1 | 0 |
| (−3) | 1 | 0 | 0 | 1 | 1 | 1 | 1 |
| | 1 | 0 | 1 | 0 | 1 | 1 | 1 |
| | 1 | 1 | 1 | 1 | 1 | 1 | 1 |
| (−2) | 0 | 0 | 1 | 1 | 0 | 1 | 0 |
| | 1 | 0 | 0 | 0 | 1 | 0 | 0 |
| | 1 | 1 | 0 | 1 | 1 | 0 | 0 |
| | 1 | 1 | 1 | 0 | 1 | 0 | 0 |
| (−1) | 0 | 0 | 0 | 1 | 0 | 1 | 1 |
| | 0 | 0 | 1 | 0 | 0 | 1 | 1 |
| | 0 | 1 | 1 | 1 | 0 | 1 | 1 |
| | 1 | 1 | 0 | 0 | 1 | 0 | 1 |
| (0) | 0 | 0 | 0 | 0 | 0 | 0 | 0 |
| | 0 | 1 | 0 | 1 | 0 | 0 | 0 |
| | 0 | 1 | 1 | 0 | 0 | 0 | 0 |
| (+1) | 0 | 1 | 0 | 0 | 0 | 0 | 1 |

As indicated in Table II the carry variable $C_j^1$ has been defined as equal to the variable $F_j^{-2}$ so that the carry over signal $C_{j-1}^1$ is obtained merely by delaying the signal $F_j^{-2}$ one binary digit time interval. Reference to Fig. 1 shows that the delay is achieved by entering signal $F_j^{-2}$ through complementer circuit *Co* into the flip-flop for producing corresponding complementary signals $F_{j-1}^{-2}$ and $\bar{F}_{j-1}^{-2}$ after the desired binary digit delay.

From Table II above, a logical Boolean expression for the variable $C_j^2$ in terms of the variables $C_{j-1}^2$, $F_j^{+1}$, and $C_j^1$ may be derived in the following manner. It is first determined from the table under what condition the variable $C_j^2$ and $C_{j-1}^2$ are both 1 value variables. This condition occurs when $C_{j-1}^2=1$ and either $F_j^{+1}$ has a 0 value or $C_{j-1}^1$ has a 1 value, which may be logically expressed as $C_j^2=C_{j-1}^2.(\bar{F}_j^{+1}+C_{j-1}^1)$. Secondly, those conditions where $C_j^2$ has a 1 value and $C_{j-1}^2$ has a 0 value are noted in the table. This condition occurs when $F_j^{+1}$ has a 0 value and $C_{j-1}^1$ simultaneously has a 1 value. This may be expressed as $C_j^2=\bar{C}_{j-1}^2.(\bar{F}_j^{+1}.C_{j-1}^1)$. By logically adding the above two expressions for $C_j^2$, a combined expression covering all possibilities of Table II is obtained as follows:

$$C_j^2=C_{j-1}^2.(\bar{F}_j^{+1}+C_{j-1}^1)+\bar{C}_{j-1}^2.\bar{F}_j^{+1}.C_{j-1}^1$$

where both the dot (.) and parenthesis ( ) indicate a logical "and" function, and the plus (+) indicates a logical "or" function in the above expressions.

By substituting the expressions $\bar{F}_j^{1,3}$ and $F_{j-1}^{-2}$ for their equivalence $\bar{F}_j^{+1}$ and $C_{j-1}^1$, respectively, in the above expression, the following logical equation is obtained:

$$C_j^2=C_{j-1}^2.(\bar{F}_j^{1,3}+F_{j-1}^{-2})+\bar{C}_{j-1}^2.\bar{F}_j^{1,3}.F_{j-1}^{-2} \quad (3)$$

In a similar manner to that utilized above in deriving a logical expression for $C_j^2$, a logical expression for the variable $R_j$ in terms of the variables $C_{j-1}^{-2}$, $C_{j-1}^1$, and $F_j^{+1}$ is obtained, thus:

$$R_j=F_j^{+1}(C_{j-1}^1.C_{j-1}^2+\bar{C}_{j-1}^1.\bar{C}_{j-1}^2)+\bar{F}_j^{+1}(C_{j-1}^1.\bar{C}_{j-1}^2+\bar{C}_{j-1}^1.C_{j-1}^2)$$

Again substituting the equivalent expressions $F_j^{1,3}$ and $F_{j-1}^{-2}$ for $F_j^{+1}$ and $C_{j-1}^1$, respectively, the above expression becomes:

$$R_j=F_j^{1,3}(F_{j-1}^{-2}.C_{j-1}^2+\bar{F}_{j-1}^{-2}.\bar{C}_{j-1}^2)+\bar{F}_j^{1,3}(F_{j-1}^{-2}.\bar{C}_{j-1}^2+\bar{F}_{j-1}^{-2}.C_{j-1}^2) \quad (4)$$

Before considering the mechanization of the gating circuits **10F(+1)*j*, 10F(−2)*j*−1, 10C2, and 10R*j* of Fig. 1, and particularly the gating circuit 10F(+1)*j*, 10F(−2)*j*−1, and 10C2** which control flip-flops F(+1)*j*, F(−2)*j*−1, and C2, respectively, it is convenient to understand the general form of equations utilized to define the input signals for flip-flops. The discussion here is brief since the general theory of flip-flop control functions is discussed in considerable detail in copending U.S. patent applications: Serial No. 327,567 for "Binary-Coded Flip-Flop Counters," by E. C. Nelson, filed December 20, 1952; and Serial No. 327,131 for "Binary-Coded Flip-Flop Counters," by R. R. Johnson, filed December 20, 1952.

There are several types of input functions which may be employed to control an associated flip-flop, four general types of which will be herein discussed. According to one type of equation, the sequence of stable states of the controlled device are directly defined so that the value of the equation (1 or 0) at a particular time indicates the desired setting of the flip-flop. Where a flip-flop circuit is controlled with this type of function it may be set through a complementer circuit such as the complementer circuit *Co* previously described. It is convenient to refer to the function defining directly the setting of a flip-flop as a "setting function." The complementer circuit is utilized to provide a pair of complementary control signals which are applied to the 1 and 0 input circuits, respectively, of the controlled flip-flop. In controlling flip-flops through gating circuits defined by "setting functions" it will be noted that a one digit time delay is introduced; that is, the flip-flop assumes a stable state during the following digit time interval corresponding to the "setting function" of the previous time interval.

The complementer circuit is utilized to provide a complementary pair of flip-flop control signals in response to applied clock or trigger pulses *Cp* and applied voltage-level signals defined by the corresponding setting function. As is evident from the previous discussion of the complementer circuit *Co*, the impressed clock pulses appear on a first output lead only when the impressed voltage-level signals are relatively high and appear on a second output lead when the impressed voltage-level signals are relatively low. Thus by applying the signals from the first and second output of the complementer on the 1 and 0 input circuits, respectively, of the associated flip-flop, the flip-flop is set to stable states corresponding directly to the relative value of the impressed voltage-level signals. It follows, therefore, that a function, i.e., the setting function, which defines directly the value or relative voltage of the impressed voltage-level signal directly defines the resulting state of the corresponding controlled flip-flop.

According to a second type of defining equation herein referred to as a "changing function," the conditions for changing the flip-flop stable state, or "triggering" the flip-flop are established. The term triggering is here used to indicate the transfer of the flip-flop from its existing stable state to its opposite stable state. This is accomplished by simultaneously applying clock pulses to both the 1 and 0 input of the flip-flop. Thus a changing function defines the conditions for simultaneously applying a clock pulse *Cp* to both the 1 and the 0 input of the associated flip-flop.

In many situations, it is desirable to separate the changing type of equation into two partial-changing functions which separately define the conditions for changing the associated flip-flop stable state from 0 to 1, and from 1 to 0. The partial-changing functions are particularly useful where the equations include the output signals of the flip-flop to be controlled. In this case the partial-changing functions may be simplified to "simplified partial changing functions" according to rules which are briefly considered below and fully described in the above-mentioned copending applications by E. C. Nelson and R. R. Johnson.

Any convenient notational system may be employed for designating the "setting," "changing," "partial changing," and "simplified partial changing" functions above defined. For example, in the above-mentioned copending applications by R. R. Johnson and E. C. Nelson, the setting functions are designated by the letter "S" followed by the letter "*a, b, . . .* or *n*" indicating the particular flip-flop which is controlled, and either a 1 or 0 depending upon whether the controlled flip-flop is to be set to the 1 or the 0 state, respectively. The changing functions are represented by the letter "C" followed by the letter "*a, b, . . .* or *n*," and the partial changing functions are represented in the same manner as the changing functions with the addition of a 1 or 0 indicating whether the flip-flop is changed to 1 or changed to 0. The simplified partial changing functions are designated by the number 1 or 0 indicating whether the functions define signals applied to the 1 or 0 input of the flip-flop, followed by the letter "A, B, . . . or N" representing the flip-flop controlled.

Herein the setting function is designated by the symbol "*to*" followed by the alphabetic letters or symbols identifying the flip-flop controlled. The simplified partial changing functions are identified in a manner similar to that employed in the above-cited copending application to Johnson and Nelson, i.e., by the number 1 or 0 indicating whether the function defines signals applied to the 1 or 0 input of the flip-flop, followed by the letter or symbols representing the flip-flop controlled. Thus the setting function for setting a flip-flop $F_j$ is designated by the notation "$toF_j$," and the simplified partial changing functions as "$1F_j$" and "$0F_j$" for application to the 1 and 0 input circuits, respectively, of the flip-flop. No notational system is employed herein for changing and partial changing functions as these functions are not employed in this description.

As is more fully explained in the above-mentioned copending applications to E. C. Nelson and R. R. Johnson, any flip-flop function may be written in the form of a setting function as follows:

$$toF_j=\overline{F}^j.G+F^j.\overline{H}$$

where complementary signals $\overline{F}^j$ and $F^j$ are produced by a flip-flop $F_j$, and where G and H may be any function of variables other than signals $\overline{F}^j$ and $F^j$.

The above general setting function may be reduced to the simplified partial changing functions:

$$1F_j=G$$

$$0F_j=H$$

The above expressed method of reducing a general setting function to its corresponding simplified changing functions may be better understood if the nature of the general setting function is analyzed. One method of analysis is to consider the setting function as defining the conditions for setting the corresponding flip-flop to its 1 or true state. Under this assumption, the above general setting function expresses the following: (1) if the flip-flop is in the true state, it will be permitted to remain in the true or 1 state so long as the function H is equal to 0, i.e., $\overline{H}=1$; (2) if the flip-flop is in the false or 0 state, it will be triggered to the true or 1 state if the function G is equal to 1; and (3) if both the functions G and H are equal to 1 ($G=1$, $H=1$), the flip-flop will be triggered from its present state to its opposite state irrespective of its present state.

It is evident, therefore, that any setting function expressed in the above general setting function manner may be readily reduced to the corresponding simplified partial changing functions by determining the corresponding G and H functions of the setting functions.

Since the carry function $C_j^2$ is to be entered into the flip-flop C2, shown in Fig. 1, it is apparent that the above Expression 3 for $C_j^2$ may be written in the form of a setting function for flip-flop C2 as:

$$toC2=C_{j-1}^2(\overline{F}_j^{1,3}+F_{j-1}^{-2})+\overline{C}_{j-1}^2.\overline{F}_j^{1,3}.F_{j-1}^{-2}$$

which reduces to the simplified partial changing functions:

$$\begin{aligned}1C2&=\overline{F}_j^{1,3}.F_{j-1}^{-2}\\0C2&=\overline{\overline{F}_j^{1,3}+F_{j-1}^{-2}}=F_j^{1,3}.\overline{F}_{j-1}^{-2}\end{aligned}$$

Similarly a setting function for flip-flop F(−2)$j$−1 may be written directly from the above Expression 2 for $F_j^{-2}$ as:

$$toF(-2)_{j-1}=A_j.B_j+\overline{X}_j(A_j+B_j)$$

where the functions 1C2 and 0C2 respectively indicate the signals applied to the 1 and 0 input circuits of flip-flop C2. The derivation of this carry function is fully described in copending U.S. patent application Serial No. 189,318 for "Arithmetic Units for Digital Computers," by Eldred C. Nelson, filed October 10, 1950.

Mechanization functions for gates 10F(+1)$j$ and 10R$j$ may be obtained directly from the above expressions for $F_j^{+1}$ (Equation 1) and R$j$ (Equation 4), thus providing the following complete set of mechanization functions respectively defining gating circuits 10F(+1)$j$, 10F(−2)$j$−1, 10C2, and 10R$j$:

[10$F$(+1)$j$]

$$F_j^{+1}=A_j.\overline{B}_j.\overline{X}_j+\overline{A}_j.B_j.\overline{X}_j+\overline{A}_j.\overline{B}_j.X_j+A_j.B_j.X_j$$

[10$F$(−2)$j$−1]

$$toF(-2)j-1=[X_j.(A_j+B_j)+A_j.B_j].Cp=C_j^1.Cp$$

(10$C$2)

$$\begin{cases}1C2=\overline{F}_j^{1,3}.F_{j-1}^{-2}.Cp\\0C2=F_j^{1,3}.\overline{F}_{j-1}^{-2}.Cp\end{cases}$$

(10$Rj$)

$$R_j=F_j^{1,3}.\overline{F}_{j-1}^{-2}.\overline{C}_{j-1}^2+\overline{F}_j^{1,3}.F_{j-1}^{-2}.\overline{C}_{j-1}^2+\overline{F}_j^{1,3}.\overline{F}_{j-1}^{-2}.C_{j-1}^2+F_j^{1,3}.F_{j-1}^{-2}.C_{j-1}^2$$

where clock pulses C$p$ are introduced as a final "and" condition to trigger the flip-flop as above explained and to synchronize the entry of digits into the flip-flops, one pulse C$p$ being applied each binary digit time of operation. No clock pulse is required to control direct-current trigger circuit F(+1)$j$. It should be noted that the above Expression 4 for R$j$ was expanded by well known principles of logical Boolean algebra to produce a mechanization function without parenthetical terms. This is done to provide a simpler gating circuit for 10R$j$.

As indicated in Fig. 1, each of the "and" functions in the equations defining the gating circuits is provided by an "and" circuit, symbolically represented in the figure by a semicircle containing a dot (⊡), which responds to signals applied to separate input terminals and produces a 1-representing output signal only when all input signals are 1-representing signals. Thus, "and" circuits 10R$j$−1, 10R$j$−2, 10R$j$−3, and 10R$j$−4 provide signals corresponding to the "and" functions:

$$F_j^{1,3}.\overline{F}_{j-1}^{-2}.\overline{C}_{j-1}^2;\ \overline{F}_j^{1,3}.F_{j-1}^{-2}.\overline{C}_{j-1}^2;\ \overline{F}_j^{1,3}.\overline{F}_{j-1}^{-2}.C_{j-1}^2;\ F_j^{1,3}.F_{j-1}^{-2}.C_{j-1}^2$$

respectively, in response to the signal sets:

$$F_j^{1,3},\ \overline{F}_{j-1}^{-2},\ \overline{C}_{j-1}^2;\ \overline{F}_j^{1,3},\ F_{j-1}^{-2},\ \overline{C}_{j-1}^2;\ \overline{F}_j^{1,3},\ \overline{F}_{j-1}^{-2},\ C_{j-1}^2;\ F_j^{1,3},\ F_{j-1}^{-2},\ C_{j-1}^2;\ F_j^{1,3},\ F_{j-1}^{-2},\ C_{j-1}^2$$

respectively, each signal being applied to a separate "and" circuit input terminal. Each of the "or" functions in the above functions is provided by an "or" circuit, symbolically represented in the figure by a semicircle containing a plus (⊕), such as circuit 10R$j$−5 shown in Fig. 1 which responds to the "and" signals produced by circuits 10R$j$−1, 10R$j$−2, 10R$j$−3, and 10R$j$−4 and produces a signal corresponding to the function R$j$. The mechanization of the other functions should be apparent from this example.

"And" and "or" circuits are now well-known in the computer art and therefore it is not deemed necessary to consider such circuits in detail in this application. Examples of such circuits are shown on pages 37 to 45 of "High Speed Computing Devices" by Engineering Research Associates, published in 1950 by McGraw-Hill Book Company, Inc., New York and London; in an article entitled "Diode Coincidence and Mixing Circuits in Digital Computers," by Tung Chang Chen, in volume 38 of the "Proceedings of the Institute of Radio Engineers," on pages 511 through 514; and in U.S. Patent No. 2,644,887 entitled "Synchronizing Generator," by A. E. Wolfe, Jr., issued July 7, 1953.

The operation of the circuit of Fig. 1 is illustrated in Table III wherein two operations are performed, one combining $X_j$, $A_j$, and $B_j$ having binary values equivalent to +111, −95, and −191, respectively, to form the result $R_j$ of −175; and the other combining $X_j$, $A_j$, and $B_j$ having values of +356, −105, and −107 to form the result $R_j$ of +144.

In Table III below, the values for the carry $C_{j-1}^2$ is obtained with the aid of Equation 3 above. Since the carry signal $C_{j-1}^2$ is developed by flip-flop C2 of Fig. 1, a one binary digit delay is introduced resulting from the inherent delay characteristic of a flip-flop. Thus each value of the carry $C_{j-1}^2$ in Table III is obtained by reference to the values for variables $F_j^{1,3}$, $F_{j-1}^{-2}$, and $C_{j-1}^2$ in the next lower order binary digital place of the table. For example, the value for $C_{j-1}^2$ in the 7th binary digital place of the table is determined by noting that $F_j^{1,3}=0$, $F_{j-1}^{-2}=1$, and $C_{j-1}^2=1$ in the 6th binary digital position of the table. Referring to Equation 3 above, it is noted that $C_j^2$ (equivalent to $C_{j-1}^2$ in the 7th binary digital place of the table) has a 1 value when $C_{j-1}^2=1$, and either $F_j^{1,3}=0$ or $F_{j-1}^{-2}=1$. Thus $C_{j-1}^2$ is equal to 1 in the 7th binary digital place of Table III. In a similar manner the remainder of the values for $C_{j-1}^2$ are completed in the table.

Since both of the carries $C_j^2$ and $C_j^1$ have been defined as having weights of −2 in Table II above it is apparent that other carry definitions are possible with a rearrangement of digits in the ranges (−3) and (−2). One variation is illustrated in Table IV below, following which are the corresponding carry definitions.

*Table III*

| | 10 | 9 | 8 | 7 | 6 | 5 | 4 | 3 | 2 | 1 | $t$ Binary time intervals |
|---|---|---|---|---|---|---|---|---|---|---|---|
| | 512 | 256 | 128 | 64 | 32 | 16 | 8 | 4 | 2 | 1 | Binary weights |
| | | | 0 | 1 | 1 | 0 | 1 | 1 | 1 | 1 | $X_j$ +111 |
| | | | 0 | 1 | 0 | 1 | 1 | 1 | 1 | 1 | $A_j$ −95 |
| | | | 1 | 0 | 1 | 1 | 1 | 1 | 1 | 1 | $B_j$ −191 |
| | | 0 | 1 | 0 | 0 | 0 | 1 | 1 | 1 | 1 | $F_j^{1,3}=F_j^{+1}$ |
| | | 1 | 0 | 0 | 1 | 1 | 1 | 1 | 1 | 0 | $F_{j-1}^{-2}$ |
| 1 | 1 | 0 | 1 | 1 | 1 | 0 | 0 | 0 | 0 | 0 | $C_{j-1}^2$ |
| 1 | 1 | 1 | 0 | 1 | 0 | 1 | 0 | 0 | 0 | 1 | $R_j$ −175 |
| | 10 | 9 | 8 | 7 | 6 | 5 | 4 | 3 | 2 | 1 | $t$ |
| | 512 | 256 | 128 | 64 | 32 | 16 | 8 | 4 | 2 | 1 | Binary weights |
| | | 1 | 0 | 1 | 1 | 0 | 0 | 1 | 0 | 0 | $X_j$ +356 |
| | | 0 | 0 | 1 | 1 | 0 | 1 | 0 | 0 | 1 | $A_j$ −105 |
| | | 0 | 0 | 1 | 1 | 0 | 1 | 0 | 1 | 1 | $B_j$ −107 |
| | 0 | 1 | 0 | 1 | 1 | 0 | 0 | 1 | 1 | 0 | $F_j^{1,3}=F_j^{+1}$ |
| | 0 | 0 | 1 | 1 | 0 | 1 | 0 | 1 | 1 | 0 | $F_{j-1}^{-2}$ |
| | 0 | 1 | 0 | 0 | 1 | 0 | 0 | 0 | 0 | 0 | $C_{j-1}^2$ |
| | 0 | 0 | 1 | 0 | 0 | 1 | 0 | 0 | 0 | 0 | $R_j$ +144 |

*Table IV*

| | $F_j^{-2}$ | $F_j^{+1}$ | $C_{j-1}^2$ | $C_{j-1}^1$ | −2 $C_j^2$ | −2 $C_j^1$ | +1 $R_j$ |
|---|---|---|---|---|---|---|---|
| (−4) | 1 | 0 | 1 | 1 | 1 | 1 | 0 |
| (−3) | 1 | 0 | 0 | 1 | 1 | 1 | 1 |
| | 1 | 0 | 1 | 0 | 1 | 1 | 1 |
| | 1 | 1 | 1 | 1 | 1 | 1 | 1 |
| (−2) | 0 | 0 | 1 | 1 | 0 | 1 | 0 |
| | 1 | 0 | 0 | 0 | 0 | 1 | 0 |
| | 1 | 1 | 0 | 1 | 1 | 0 | 0 |
| | 1 | 1 | 1 | 0 | 1 | 0 | 0 |
| (−1) | 0 | 0 | 0 | 1 | 0 | 1 | 1 |
| | 0 | 0 | 1 | 0 | 0 | 1 | 1 |
| | 0 | 1 | 1 | 1 | 1 | 0 | 1 |
| | 1 | 1 | 0 | 0 | 1 | 0 | 1 |
| (0) | 0 | 0 | 0 | 0 | 0 | 0 | 0 |
| | 0 | 1 | 0 | 1 | 0 | 0 | 0 |
| | 0 | 1 | 1 | 0 | 0 | 0 | 0 |
| (+1) | 0 | 1 | 0 | 0 | 0 | 0 | 1 |

$$C_j^2=F_j^{-2}\cdot(C_{j-1}^2+C_{j-1}^1)+F_j^{+1}\cdot C_{j-1}^2\cdot C_{j-1}^1$$

$$1C_j^2=F_j^{-2}\cdot C_{j-1}^1$$

$$0C_j^2=\bar{F}_j^{-2}\cdot(\bar{F}_j^{+1}+\bar{C}_{j-1}^1)$$

$$C_j^1=\bar{F}_j^{+1}\cdot(F_j^{-2}+C_{j-1}^2)+F_j^{-2}\cdot F_j^{+1}\cdot C_{j-1}^2$$

It does not appear that these carry functions are as economical as those utilized in defining the embodiment of Fig. 1, where $C_j^1=F_j^{-2}$.

Another variation in carry definition is illustrated in Table V, below, wherein a carry-over-two variable $C_{j-2}^2$ is defined, having a weight of −1, the corresponding new carry $C_j^2$ having a weight of −4. The algebraic definitions derived from Table V are shown below the table. Again it will be noted that the definition $C_j^1=F_j^{-2}$ appears to be considerably more economical.

*Table V*

| Aggregate Weight $X_jA_jB_jC_{j-1}^2C_{j-1}^1$ | $-2$ $F_j^{-2}$ | $+1$ $F_j^{+1}$ | $-1$ $C_{j-1}^2$ | $-1$ $C_{j-1}^1$ | $-4$ $C_j^2$ | $-2$ $C_j^1$ | $+1$ $R_j$ |
|---|---|---|---|---|---|---|---|
| (−4) | 1 | 0 | 1 | 1 | 1 | 0 | 0 |
| (−3) | 1 | 0 | 0 | 1 | 1 | 0 | 1 |
| | 1 | 0 | 1 | 0 | 1 | 0 | 1 |
| | 1 | 1 | 1 | 1 | 1 | 0 | 1 |
| (−2) | 0 | 0 | 1 | 1 | 0 | 1 | 0 |
| | 1 | 0 | 0 | 0 | 0 | 1 | 0 |
| | 1 | 1 | 0 | 1 | 0 | 1 | 0 |
| | 1 | 1 | 1 | 0 | 0 | 1 | 0 |
| (−1) | 0 | 0 | 0 | 1 | 0 | 1 | 1 |
| | 0 | 0 | 1 | 0 | 0 | 1 | 1 |
| | 0 | 1 | 1 | 1 | 0 | 1 | 1 |
| | 1 | 1 | 0 | 0 | 0 | 1 | 1 |
| (0) | 0 | 0 | 0 | 0 | 0 | 0 | 0 |
| | 0 | 1 | 0 | 1 | 0 | 0 | 0 |
| | 0 | 1 | 1 | 0 | 0 | 0 | 0 |
| (+1) | 0 | 1 | 0 | 0 | 0 | 0 | 1 |

$$C_j^2 = \overline{C}_j^1.F_j^{-2}$$

$$C_j^1 = \overline{F}_j^{-2}.[\overline{F}_j^{+1}.(C_{j-2}^2+C_{j-1}^1)+C_{j-2}^2.C_{j-1}^1] + F_j^{-2}.[F_j^{+1}.(\overline{C}_{j-2}^2+\overline{C}_{j-1}^1)+\overline{C}_{j-2}^2.\overline{C}_{j-1}^1]$$

Reference is now made to Fig. 2 illustrating an embodiment of the present invention for receiving complementary binary input signals $A_j$, $\bar{A}_j$; $B_j$, $\bar{B}_j$; and $X_j$, $\bar{X}_j$ representing three binary input numbers A, B, and X to produce an output binary signal series R*j* representing the operation $X+A-B$ on the input numbers. The embodiment of Fig. 2 includes gating circuits 20F(−1)*j* and 20F(+2)*j*−1 responsive to the input signals $A_j$, $B_j$, and $X_j$ and for producing voltage-level signals $F_j^{-1}$ and $F_j^{(+2)}$, respectively, which are applied to the input circuit of a direct-current trigger circuit F(−1)*j* and a complementer C*o*, respectively. The embodiment of Fig. 2 further includes a flip-flop F(+2)*j*−1 coupled to the complementer C*o* and responsive to the output signals of complementer C*o* for producing complementary flip-flop output signals $F_{j-1}^{+2}$ and $\bar{F}_{j-1}^{+2}$. A gating circuit 20C(−)*j*−1 is coupled to the direct-current trigger circuit F(−1)*j* and flip-flop F(+2)*j*−1 for receiving signals $F_{j-1}^{+2}$ and $\bar{F}_{j-1}^{+2}$ from flip-flop $(F+2)_j-1$, and signals $F_j^{-1}$ and $\bar{F}_j^{-1}$ from the direct-current trigger F(−1)*j* for producing flip-flop control signals which are impressed on a carry flop-flop C(−1)*j*−1. The output signals $C_{j-1}^-$ and $\bar{C}_{j-1}^-$ from flip-flop $C(-1)_j-1$ are impressed on output gate 20R*j* along with signals $F_j^{-1}$, $\bar{F}_j^{-1}$; and $F_{j-1}^{+2}$, $\bar{F}_{j-1}^{+2}$; output gate 20R*j* producing, in response thereto the output signal series R*j*.

The flip-flops F(+2)*j*−1 and C(−)*j*−1, the direct-current trigger circuit F(−1)*j*, and the complementer C*o* are similar to the flip-flop, direct-current trigger, and complementer, respectively, described in detail in relation to Fig. 1. It is therefore deemed unnecessary to further describe these elements at this time.

The mechanization of the gating circuits 20F(−1)*j*, 20F(+2)*j*−1, 20C(−)*j*−1, and 20R*j* of Fig. 2 are facilitated, as before in conjunction with Fig. 1, by reference to mechanization functions, derived from logical Boolean equations, defining the structure of these gating circuits.

The mechanization functions for the embodiments of Fig. 2, designed to perform the operation: $X_j+A_j-B_j$ may be derived in a manner similar to that described above from Tables VI and VII below, illustrating the translation of input signals $X_j$, $A_j$, and $B_j$ into weighted signals $F_j^{+2}$ and $F_j^{-1}$ having weights +2 and −1, respectively; and the translation of signals $F_j^{+2}$, $F_j^{-1}$, $C_{j-1}^+$, and $C_{j-1}^-$ having weights +2, −1, +1, −1, respectively; into result indicating signals $C_j^+$, $C_j^-$, and $R_j$, having weights +2, −2, and +1, respectively. It is significant to remember that $C_j^+=F_j^{+2}$, therefore $F_{j-1}^{+2}$ is equivalent to the delayed carry $C_{j-1}^+$ in Table VII below; similarly, $F_j^{1,3}$ is equivalent to $F_j^{-1}$.

*Table VI*

[Function $X+A-B$]

| | $+1$ $X_j$ | $+1$ $A_j$ | $-1$ $B_j$ | $F_j^{+2}$ | $F_j^{-1}$ |
|---|---|---|---|---|---|
| (−1) | 0 | 0 | 1 | 0 | 1 |
| (0) | 0 | 0 | 0 | 0 | 0 |
| | 0 | 1 | 1 | 0 | 0 |
| | 1 | 0 | 1 | 0 | 0 |
| (1) | 0 | 1 | 0 | 1 | 1 |
| | 1 | 0 | 0 | 1 | 1 |
| | 1 | 1 | 1 | 1 | 1 |
| (2) | 1 | 1 | 0 | 1 | 0 |

*Table VII*

| | $+2$ $F_j^{+2}$ | $-1$ $F_j^{-1}$ | $+1$ $C_{j-1}^+$ | $-1$ $C_{j-1}^-$ | $+2$ $C_j^+$ | $-2$ $C_j^-$ | $+1$ $R_j$ |
|---|---|---|---|---|---|---|---|
| (0) | 0 | 0 | 0 | 0 | 0 | 0 | 0 |
| | 0 | 0 | 1 | 1 | 0 | 0 | 0 |
| | 0 | 1 | 1 | 0 | 0 | 0 | 0 |
| | 1 | 1 | 0 | 1 | 1 | 1 | 0 |
| (−1) | 0 | 0 | 0 | 1 | 0 | 1 | 1 |
| | 0 | 1 | 0 | 0 | 0 | 1 | 1 |
| | 0 | 1 | 1 | 1 | 0 | 1 | 1 |
| (−2) | 0 | 1 | 0 | 1 | 0 | 1 | 0 |
| (+1) | 0 | 0 | 1 | 0 | 0 | 0 | 1 |
| | 1 | 0 | 0 | 1 | 1 | 1 | 1 |
| | 1 | 1 | 0 | 0 | 1 | 1 | 1 |
| (+2) | 1 | 0 | 0 | 0 | 1 | 0 | 0 |
| (+3) | 1 | 0 | 1 | 0 | 1 | 0 | 1 |

Utilizing the same techniques previously explained in detail, a logical Boolean expression for variable $F_j^{-1}$ may be derived from Table VI above as:

$$F_j^{-1} = A_j.\overline{B}_j.\overline{X}_j + \overline{A}_j.B_j.\overline{X}_j + \overline{A}_j.\overline{B}_j.X_j + A_j.B_j.X_j \qquad (5)$$

and for $F_j^{+2}$ as:

$$F_j^{+2} = X_j.(A_j+\overline{B}_j) + A_j.\overline{B}_j \qquad (6)$$

In a similar manner, logical Boolean expressions for variable $C_j^-$ may be derived from Table VII above as follows:

$$C_j^- = \overline{C}_{j-1}^-(F_j^{-1}.\overline{C}_{j-1}^+) + C_{j-1}^-(F_j^{-1}+\overline{C}_{j-1}^+)$$

By substituting the equivalents $F_j^{1,3}$ and $F_{j-1}^{+2}$ for $F_j^{-1}$ and $C_{j-1}^+$, respectively, the above expression becomes:

$$C_j^- = \overline{C}_{j-1}^-(F_j^{1,3}.\overline{F}_{j-1}^{+2}) + C_{j-1}^-(F_j^{1,3}+\overline{F}_{j-1}^{+2}) \qquad (7)$$

A logical Boolean expression for the variable R*j* may be derived from Table VII as:

$$R_j = F_j^{-1}.\overline{C}_{j-1}^+.\overline{C}_{j-1}^- + \overline{F}_j^{-1}.C_{j-1}^+.\overline{C}_{j-1}^- + \overline{F}_j^{-1}.\overline{C}_{j-1}^+.C_{j-1}^- + F_j^{-1}.C_{j-1}^+.C_{j-1}^-$$

and again substituting the equalities $F_j^{1,3}=F_j^{-1}$; and $F_{j-1}^{+2}=C_{j-1}^+$, the above expression becomes:

$$R_j = F_j^{1,3}.\overline{F}_{j-1}^{+2}.\overline{C}_{j-1}^- + \overline{F}_j^{1,3}.F_{j-1}^{+2}.\overline{C}_{j-1}^- + \overline{F}_j^{1,3}.\overline{F}_j^{+2}.C_{j-1}^- + F_j^{1,3}.F_{j-1}^{+2}.C_{j-1}^- \qquad (8)$$

The above Expressions 5, 6, 7, and 8 may be put in the form of mechanization functions for the embodiment of Fig. 2 as follows:

[20F(−1)*j*]

$$F_j^{-1} = F^{1,3}(A_j, B_j, X_j) = A_j.\overline{B}_j.\overline{X}_j + \overline{A}_j.B_j.\overline{X}_j + \overline{A}_j.B_j.X_j + A_j.B_j.X_j$$

[20F(+2)j—1]

$$toF(+2)j-1=C_j^{+}=[X_j.(A_j+\overline{B}_j)+A_j.\overline{B}_j].Cp$$

$$toC(-)j-1=[\overline{C}_{j-1}^{-}(F_j^{1,3}.\overline{F}_{j-1}^{+2})+C_{j-1}^{-}(F_j^{1,3}+\overline{F}_{j-1}^{+2})]Cp$$

which reduces to the simplified partial changing functions:

[20C(—)j—1]

$$1C(-)j-1=F_j^{1,3}.\overline{F}_{j-1}^{+2}.Cp$$

$$0C(-)j-1=\overline{F}_j^{1,3}.F_{j-1}^{+2}.Cp$$

[20Rj]

$$R_j=G^{1,3}(F_j^{1,3},\ F_{j-1}^{+2},\ C_{j-1}^{-})=F_j^{1,3}.\overline{F}_{j-1}^{+2}.\overline{C}_{j-1}^{-}+\overline{F}_j^{1,3}.F_{j-1}^{+2}.\overline{C}_{j-1}^{-}+\overline{F}_j^{1,3}.\overline{F}_{j-1}^{+2}.C_{j-1}^{-}+F_j^{1,3}.F_{j-1}^{+2}.C_{j-1}^{-}$$

The mechanization of gating circuits 20F(—1)j, 20F(+2)j—1, 20C(—)j, and 20Rj according to the corresponding functions should be apparent from the foregoing examples.

The operation of the circuit of Fig. 2 is illustrated in Table VIII below:

*Table VIII*

[Operation $X_i+A_i-B_i$]

| 9 | 8 | 7 | 6 | 5 | 4 | 3 | 2 | 1 | t |
|---|---|---|---|---|---|---|---|---|---|
| | | 64 | 32 | 16 | 8 | 4 | 2 | 1 | Binary weight |
| | | 0 | 1 | 1 | 0 | 0 | 1 | 1 | $X_i$ +51 |
| | | 1 | 1 | 0 | 0 | 0 | 1 | 1 | $A_i$ +99 |
| | | 1 | 0 | 1 | 1 | 1 | 1 | 1 | $B_i$ −95 |
| 0 | 0 | 0 | 0 | 0 | 1 | 1 | 1 | 1 | $F_j^{1,3}=F_j^{-1}$ |
| 0 | 0 | 1 | 0 | 0 | 0 | 1 | 1 | 0 | $F_{j-1}^{+2}=C_{j-1}^{+}$ |
| 0 | 0 | 1 | 1 | 1 | 1 | 1 | 1 | 0 | $C_{j-1}^{-}$ |
| 0 | 0 | 0 | 1 | 1 | 0 | 1 | 1 | 1 | $R_i$ +55 |
| | | 0 | 1 | 1 | 0 | 0 | 1 | 1 | $X_i$ +51 |
| | | 0 | 1 | 0 | 0 | 0 | 1 | 1 | $A_i$ +35 |
| | | 1 | 0 | 1 | 1 | 1 | 1 | 1 | $B_i$ −95 |
| | 0 | 1 | 0 | 0 | 0 | 1 | 1 | 0 | $F_{j-1}^{+2}=C_{j-1}^{+}$ |
| | | 1 | 0 | 0 | 1 | 1 | 1 | 1 | $F_j^{1,3}=F_j^{-1}$ |
| 1 | 1 | 1 | 1 | 1 | 1 | 1 | 1 | 0 | $C_{j-1}^{-}$ |
| 1 | 1 | 1 | 1 | 1 | 0 | 1 | 1 | 1 | $R_i$ −9 |

In Table VIII above it should be noted that the values entered in the table for the variable $C_{j-1}^{-}$ are obtained from Equation 7 above expressing the variable $C_j^{-}$ in terms of its previous value $C_{j-1}^{-}$ and the variables $F_j^{1,3}$ and $F_{j-1}^{+2}$. In the table, the variable $C_j^{-}$ is expressed as $C_{j-1}^{-}$ indicating that the variable is treated as delayed one binary digit place in comparison with the variable $F_j^{1,3}$. This is consistent with the structure of Fig. 2 in that the carry signal $\overline{C}_{j-1}^{-}$ is produced by the flip-flop C(—1)j—1, the flip-flop introducing a one binary bit delay. In Table VIII, therefore, each value for $C_{j-1}^{-}$ is determined by noting the values of variable $F_j^{1,3}$, $F_{j-1}^{+2}$, and $C_{j-1}^{-}$ in the next lower order binary digital place of the table.

As in the case of the equations defining the embodiment of Fig. 1, the equations defining the embodiment of Fig. 2 may be modified to define different carry functions. It appears, however, that defining $C_j^{+}$ to be equal to $F_{j-1}^{+2}$ is the most economical.

The principles thus far discussed are readily extended to greater numbers of input signals. It appears that the most economical mechanizations for four, five, or six input signals are achieved by combining the input signals three at a time in the manner discussed. Thus, in the embodiment of Fig. 3, where the operation $X_j+A_j-B_j-Y_j$ is to be performed, the signals $X_j$, $A_j$, and $B_j$ are first translated to the variables $F_{j-1}^{+2}$ and $F_j^{-1}$ in the manner previously discussed; signal $F_{j-1}^{+2}$ being formed through a complementer circuit *Co* and a flip-flop $F(+2)_{j-1}$ producing signals $F_{j-1}^{+2}$, and $F_{j-1}^{+2}$, and signals $F_j^{-1}$ and $F_j^{-1}$ being formed through direct-current trigger circuit $F(-1)_j$. The variables $F_{j-1}^{+2}$, $F_j^{-1}$, and $Y_j$, considered as having weights +1, —1, and —1, respectively, are then combined to form the variables $G_{j-1}^{-2}$ and $G_j^{+1}$, which are similar to the variables $F_{-1}^{-2}$ and $F_j^{+1}$ previously discussed, signals $G_{j-1}^{-2}$ and $G_j^{+1}$ being formed respectively through pulse complementer *Co* and flip-flop G(—2)j—1, and direct-current complementer circuit G(+1)j.

[30F(—1)j]

$$F_i^{-1}=F^{1,3}(A_i,\ B_i,\ X_i)$$

[30F(+2)j—1]

$$toF(+2)j-1=C_j^{+}=[X_j.(A_j+\overline{B}_j)+A_j.\overline{B}_j].Cp$$

[30G(+1)j]

$$G_j^{+1}=G^{1,3}(F_j^{-1},\ F_{j-1}^{+2},\ Y_j)=F_j^{-1}.\overline{F}_{j-1}^{+2}.\overline{Y}_j+\overline{F}_j^{-1}.F_{j-1}^{+2}.\overline{Y}_j+\overline{F}_j^{-1}.\overline{F}_{j-1}^{+2}.Y_j+F_j^{-1}.F_{j-1}^{+2}.Y_j$$

[30G(—2)j—1]

$$toG(-2)j-1=C_j^{1}=[\overline{F}_{j-1}^{+2}.(F_j^{-1}+Y_j)+F_j^{-1}.Y_j]Cp$$

[30C2]

$$1C2=\overline{G}_j^{+1}.G_{j-1}^{-2}.Cp$$

$$0C2=G_j^{+1}.\overline{G}_{j-1}^{-2}.Cp$$

[30Rj]

$$R_j=G^{1,3}(G_j^{+1},\ G_{j-1}^{-2},\ C_{j-1}^{2})=G_j^{+1}.\overline{G}_{j-1}^{-2}.\overline{C}_{j-1}^{2}+\overline{G}_j^{+1}.G_{j-1}^{-2}.\overline{C}_{j-1}^{2}+\overline{G}_j^{+1}.\overline{G}_{j-1}^{-2}.C_{j-1}^{2}+G_j^{+1}.G_{j-1}^{-2}.C_{j-1}^{2}$$

Figure 3:
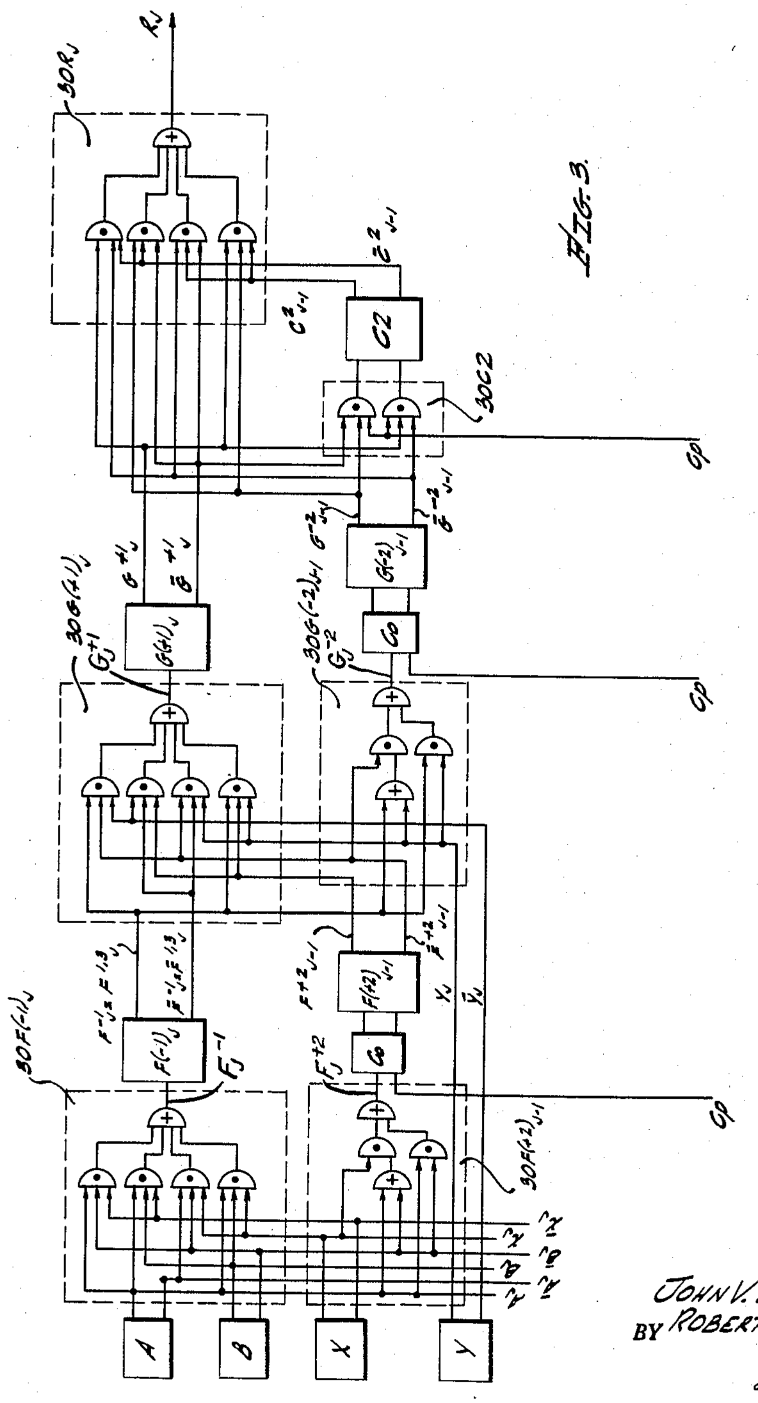
Fig. 3 is a schematic diagram of a 4-input adder-subtracter according to the present invention for performing the operation: $X_j+A_j-B_j-Y_j$.

The operation of the embodiment of Fig. 3 is illustrated in Table IX below.

*Table IX*

| 7 | 6 | 5 | 4 | 3 | 2 | 1 | t |
|---|---|---|---|---|---|---|---|
| 64 | 32 | 16 | 8 | 4 | 2 | 1 | Binary weight |
| 0 | 1 | 1 | 0 | 1 | 1 | 1 | $X_i$ +55 |
| 0 | 0 | 0 | 1 | 0 | 1 | 1 | $A_i$ +11 |
| 0 | 1 | 0 | 1 | 1 | 1 | 1 | $B_i$ −47 |
| 0 | 0 | 0 | 0 | 1 | 1 | 1 | $Y_i$ −7 |
| 0 | 1 | 0 | 0 | 1 | 1 | 0 | $F_{j-1}^{+2}=C_j^{+}$ |
| 0 | 0 | 1 | 0 | 0 | 1 | 1 | $F_j^{-1}=F_j^{1,3}$ |
| 0 | 1 | 1 | 0 | 0 | 1 | 0 | $G_j^{+1}$ |
| 0 | 1 | 0 | 0 | 1 | 1 | 0 | $G_{j-1}^{-2}$ |
| 0 | 0 | 1 | 1 | 0 | 0 | 0 | $C_{j-1}^{2}$ |
| 0 | 0 | 0 | 1 | 1 | 0 | 0 | $R_i$ +12 |

From the foregoing description it is apparent that the present invention provides a multiple input binary adder-subtracter wherein any of a plurality of addition or subtraction operations may be performed with a minimum of gating circuit elements. Since carries are provided which may represent any desired result weight it is apparent that the type of adder-subtracter provided is readily adaptable for use in binary-coded decimal systems where carry corrections are to be performed by changing the initial result weight at the beginning of a binary-coded decimal digit group.

What is claimed as new is:

1. An arithmetic unit for adding M binary input numbers and simultaneously subtracting N binary input numbers therefrom to form the corresponding binary result number, where M and N are each an integer not smaller than 1 and $(M+N)$ is an integer greater than 2, the M and the N binary input numbers being represented by M and N corresponding series of binary electrical input signals, respectively, and the result being represented by a series of electrical output signals, each binary electrical input signal of a series representing a binary digit of the corresponding binary input number and each binary electrical output signal of a series representing a binary digit of the binary result number; said arithmetic unit comprising: first means responsive to the binary electrical input signals and for providing each input signal of the M series of input signals with a significance of +1 and for providing each input signal of the N series of input signals with a significance of −1, and for producing an intermediate series of binary electrical signals indicating the aggregate significance of said binary electrical input signals in accordance with a predetermined binary code effective only within said arithmetic unit; second means coupled to said first means and responsive to said intermediate series of binary electrical signals for producing binary electrical carry signals; and third means coupled to said first and said second means and responsive to said intermediate series of binary electrical signals and said carry signals for producing the series of electrical output signals representative of the desired binary result number.

2. The arithmetic unit defined in claim 1 wherein M is equal to 1 and N is equal to 2; wherein said intermediate series of binary electrical signals produced by said first means includes first intermediate signals $F_j^{-2}$ representing a significance of −2 and second intermediate signals $F_j^{+1}$ representing a significance of +1, where the subscript $j$ indicates a binary digital place of the input binary numbers; and wherein said first means includes a first gating circuit responsive to the binary electrical input signals for producing said first intermediate signals $F_j^{-2}$ and a second gating circuit responsive to said binary input signals for producing said second intermediate signals $F_j^{+1}$, said first and said second gating circuits each including at least one logical "and" and one logical "or" circuit.

3. The arithmetic unit defined in claim 2 wherein said binary electrical carry signals produced by said second means are representative of first and second carry signals $C_{j-1}^1$ and $C_{j-1}^2$, respectively, each being assigned a significance of −1, where the subscript $(j-1)$ indicates a next lower order binary digital place of the binary input numbers as compared to a binary digital place of the input numbers indicated by the subscript $j$; and wherein said second means includes first circuit means responsive to said first intermediate signals $F_j^{-2}$ for delaying said first intermediate signals by one digital position to produce signals $F_{j-1}^{-2}$ directly representative of said first carry signals $C_{j-1}^1$, and second circuit means responsive to said first carry representing signals $F_{j-1}^{-2}$ and said second intermediate signals $F_j^{+1}$ for producing said second carry signals $C_{j-1}^2$.

4. The arithmetic unit defined in claim 3 wherein said third means includes at least one logical "and" and one logical "or" circuit connected in a manner to produce the series of electrical output signals in accordance with particular patterns of occurrence of said second intermediate signals $F_j^{+1}$ and of said first carry representing signals $F_{j-1}^{-2}$ and of said carry signals $C_{j-1}^2$.

5. The arithmetic unit defined in claim 3 wherein said first carry representing signals are represented by a pair of complementary carry representing binary signals $F_{j-1}^{-2}$ and $\bar{F}_{j-1}^{-2}$, where a bar (‾) over a symbol of a signal indicates the complement of the signal represented by the symbol, wherein said second intermediate signals are represented by a pair of complementary second intermediate signals $F_j^{+1}$ and $\bar{F}_j^{+1}$; wherein means is provided for applying clock pulse $Cp$ to said first and second circuit means; wherein said first circuit means includes a bistable flip-flop for receiving said first intermediate signals $F_j^{-2}$ and for producing the pair of complementary carry representing binary signals $F_{j-1}^{-2}$ and $\bar{F}_{j-1}^{-2}$; and wherein said second circuit means includes a bistable flip-flop C2 having input circuits 1 and 0 and producing complementary output signals $C_{j-1}^{-2}$ and $\bar{C}_{j-1}^2$ representing said second carry signals $C_{j-1}^2$, said second circuit means further including a logical gating circuit for receiving said complementary second intermediate signals $F_j^{+1}$, $\bar{F}_j^{+1}$ and said complementary carry representing binary signals $F_{j-1}^{-2}$, $\bar{F}_{j-1}^{-2}$, and for producing control signals 1C2 and 0C2 which are applied to the 1 and 0 input circuits, respectively, of said bistable flip-flop C2, said logical gating circuit having two logical "and" circuits connected in accordance with the logical function:

$$1C2=F_{j-1}^{-2}.\bar{F}_j^{+1}.Cp$$

$$0C2=\bar{F}_{j-1}^{-2}.F_j^{-1}.Cp$$

where a dot (.) and a plus (+) indicate a logical "and" and a logical "or" function, respectively, and where the bar (‾) over a symbol of a signal indicates the complement of the signal represented by the symbol.

6. The arithmetic unit defined in claim 2 wherein the M binary input number is represented by a binary electrical input signal series $X_j$, the N binary input numbers are represented by binary electrical input signal series $A_j$ and $B_j$, respectively, and the binary result number is represented by a series of electrical output signals $R_j$; wherein said first gating circuit includes two logical "and" circuits and two logical "or" circuits connected to produce said first intermediate signals $F_j^{-2}$ in accordance with the Boolean algebraic equation:

$$F_j^{-2}=\bar{X}_j.(A_jB_j)+A_j.B_j$$

and wherein said second gating circuit includes four logical "and" circuits and one logical "or" circuit connected to produce said second intermediate signals $F_j^{+1}$ in accordance with the Boolean algebraic equation:

$$F_j^{+1}=A_j.\bar{B}_j.\bar{X}_j+\bar{A}_j.B_j.\bar{X}_j+\bar{A}_j.\bar{B}_j.X_j+A_j.B_j.X_j$$

where the dot (.) and parenthesis ( ) indicate a logical "and" function, the plus (+) indicates a logical "or" function, and a bar (‾) over a symbol of a signal indicates the complement of the signal represented by the symbol.

7. The arithmetic unit defined in claim 1 where M is equal to 2 and N is equal to 1; wherein said intermediate series of binary electrical signals produced by said first means includes first and second intermediate signals $F_j^{+2}$ and $F_j^{-1}$, respectively, representing a significance of +2 and −1, respectively, where the subscript $j$ indicates a binary digital place of the input numbers; and wherein said first means includes a first gating circuit responsive to the binary electrical input signals for producing said first intermediate signals $F_j^{+2}$ and a second gating circuit responsive to the binary electrical input signals for producing said second intermediate signals $F_j^{-1}$, said first and said second gating circuits each including at least one logical "and" and one logical "or" circuit.

8. The arithmetic unit defined in claim 7 wherein said binary electrical carry signals produced by said second means are representative of first and second carry signals $C_{j-1}^{+}$ and $C_{j-1}^{-}$ having a significance of +1 and −1, respectively, where the subscript $(j-1)$ indicates the occurrence of signals in the digital position next to the position indicated by the subscript $j$; and wherein said second means includes first circuit means responsive to said first intermediate signals $F_j^{+2}$ for delaying said first intermediate signals to occur at the next binary digital place of the input numbers to produce signals $F_{j-1}^{+2}$ directly representative of said first carry signals $C_{j-1}^{+}$, and second circuit means responsive to said second intermediate signals $F_j^{-1}$ and said first carry representing signals $F_{j-1}^{+2}$ for producing said second carry signals $C_{j-1}^{-}$.

9. The arithmetic unit defined in claim 8 wherein said third means includes at least one logical "and" and one logical "or" circuit connected to produce said series of electrical ouput signals in accordance with particular combinations of occurrence said first carry signal $C_{j-1}^{+}$, said second carry signal $C_{j-1}^{-}$, and said first intermediate signals $F_j^{-1}$.

10. The arithmetic unit defined in claim 1 wherein M and N are each equal to 2; and wherein said intermediate series of binary electrical signals produced by said first means includes first and second intermediate signals $G_j^{-2}$ and $G_j^{+1}$, respectively, where the subscript $j$ indicates a binary digital place of the input binary numbers; and wherein said first means includes a first gating circuit responsive to the M series of binary electrical input signals and one of the N series of binary electrical input signals for producing first and second partial intermediate signals $F_j^{+2}$ and $F_j^{-1}$ representing a significance of +2 and −1, respectively, a delay circuit coupled to said first gating circuit and responsive to said first partial intermediate signals $F_j^{+2}$ for producing delayed partial intermediate signals $F_{j-1}^{+2}$, where the subscript $(j-1)$ indicates the occurrence of signals in the digital position next to the position indicated by the subscript $j$, and a second gating circuit coupled to said first gating circuit and to said delay circuit and responsive to said second partial intermediate signals $F_j^{-1}$, said delayed partial intermediate signals $F_{j-1}^{+2}$, and the other one of said N series of binary electrical input signals for producing said first and second intermediate signals $G_j^{-2}$ and $G_j^{+1}$, respectively.

11. The arithmetic unit defined in claim 10 wherein said binary electrical carry signals produced by said second means include first and second carry signals $C_{j-1}^{1}$ and $C_{j-1}^{2}$, respectively, each being assigned a significance of −1; and wherein said means includes first circuit means coupled to said second gating circuit and responsive to said first intermediate signals $G_j^{-2}$ for delaying said first intermediate signals by a period of time so as to produce signals $G_{j-1}^{-2}$ corresponding to signals $G_j^{-2}$ and occurring in the next digital place, signals $G_{j-1}^{-2}$ directly representing said first carry signals $C_{j-1}^{1}$, and second circuit means coupled to said first circuit means and to said second gating circuit and responsive to said first carry representing signals $G_{j-1}^{-2}$ and said second intermediate signals $G_j^{+1}$ for producing said second carry signals $C_{j-1}^{2}$.

12. The arithmetic unit defined in claim 11 wherein said third means includes at least one logical "and" and one logical "or" circuit connected in a manner to produce the series of electrical output signals in accordance with particular patterns of occurrence of said second intermediate signals $G_j^{+1}$ and said second carry signals $C_{j-1}^{2}$.

13. An electronic circuit synchronized by externally applied synchronizing pulses $Cp$ for simultaneously receiving a first, a second, and a third binary input number and for subtracting the first and the second binary input numbers from the third binary input number to produce a corresponding result binary number, the first, the second, and the third binary input numbers being represented by binary input signal series $A_j$, $B_j$, and $X_j$, respectively, and the binary result number being represented by output binary signal series $R_j$, where the subscript $j$ indicates a binary digital place of the binary input numbers, each binary signal of a series representing a binary digit of the corresponding binary number; said electronic circuit comprising: first means responsive to the input binary signal series for providing each binary signal of binary signal series $A_j$, $B_j$, and $X_j$ with a significance of −1, −1, and +1, respectively, and for producing intermediate signals indicating the total significance of the input binary signal series, said first means including a first gating circuit responsive to said input binary signal series for producing first intermediate signals $F_j^{-2}$, and a second gating circuit responsive to said input binary signal series for producing second intermediate signals $F_j^{+1}$, said first and second intermediate signals $F_j^{-2}$ and $F_j^{+1}$ representing a significance of −2 and +1, respectively, said series of intermediate binary electrical signals consisting of said first and second intermediate signals; second means coupled to said first means and responsive to said first and second intermediate signals $F_j^{-2}$ and $F_j^{+1}$ for producing first and second carry signals $C_{j-1}^{1}$ and $C_{j-1}^{2}$, respectively, each being provided wtih a significance of −1, where the subscript $(j-1)$ indicates the occurrence of signals in the digital position next to the position indicated by the subscript $j$, said second means including first circuit means coupled to said first gating circuit and responsive to said first intermediate signals $F_j^{-2}$ for delaying said first intermediate signals, thereby to produce signals $F_{j-1}^{-2}$ directly representative of said first carry signals $C_{j-1}^{1}$, and second circuit means coupled to said second gating circuit, and said first circuit means and said second intermediate signals $F_j^{+1}$ and responsive to said first carry representing signals $F_{j-1}^{-2}$ for producing said second carry signals $C_{j-1}^{2}$; and third means coupled to said first and said second means and responsive to said second intermediate signals $F_j^{+1}$, and said second carry signals $C_{j-1}^{2}$ for producing the signal series $R_j$ representing the corresponding binary result number.

14. The electronic circuit defined in claim 13 wherein said binary input signal series $A_j$, $B_j$ and $X_j$ are represented by complementary signal pairs $A_j$, $\bar{A}_j$; $B_j$, $\bar{B}_j$; and $X_j$, $\bar{X}_j$; respectively, where a bar (‾) over a symbol of a signal indicates the complement of the signal indicated by the symbol; wherein said first gating circuit includes two logical "and" circuits and two logical "or" circuits connected to produce said first intermediate signals $F_j^{-2}$ in conformity with the logical Boolean equation:

$$F_j^{-2}=\bar{X}_j.(A_j+B_j)+A_j.B_j$$

and wherein said second gating circuit includes four logical "and" circuits and one logical "or" circuit connected to produce said second intermediate signals $F_j^{+1}$ in conformity with the logical Boolean equation:

$$F_j^{+1}=A_j.\bar{B}_j.\bar{X}_j.+\bar{A}_j.B_j\bar{X}_j+\bar{A}_j.\bar{B}_j.X_j+A_j.B_j.X_j$$

where a dot (.) or a parenthesis ( ) indicates a logical "and" function, and a plus (+) indicates a logical "or" function.

15. The electronic circuit defined in claim 13 wherein said intermediate signals $F_j^{+1}$ are represented by complementary binary signals $F_j^{+1}$ and $\bar{F}_j^{+1}$, the bar (‾) over a symbol of a signal indicating the complement of the signal represented by the symbol; wherein said first circuit means includes a first bistable flip-flop for receiving said first intermediate signals $F_j^{-2}$ and for producing complementary signals $F_{j-1}^{-2}$ and $\bar{F}_{j-1}^{-2}$; and wherein said second circuit means includes a flip-flop control circuit and a second bistable flip-flop, said flip-flop control circuit being coupled to said first circuit means and said second gating circuit and responsive to complementary signals $F_j^{+1}$, $\bar{F}_j^{+1}$, and $F_{j-1}^{-2}$, $\bar{F}_{j-1}^{-2}$ for producing flip-flop control signals 1C2 and 0C2 for introduction to said second flip-flop to produce the complementary carry signals $C_{j-1}^{-2}$ and $\bar{C}_{j-1}^{-2}$.

16. The electronic circuit defined in claim 15 wherein said flip-flop control circuit includes two logical "and" circuits electrically coupled to produce said flip-flop control signals 1C2 and 0C2, said logical "and" circuits being electrically connected in conformity with the logical equation:

$$1C2=F_{j-1}^{-2}.\bar{F}_{j}^{+1}.Cp$$

$$0C2=\bar{F}_{j-1}^{-2}.F_{j}^{+1}.Cp$$

where the dot (.) indicates the logical "and" function.

17. The electronic circuit defined in claim 13 wherein said second intermediate signals $F_j{}^{+1}$, said first carry representing signals $F_{j-1}{}^{-2}$, and said second carry signals $C_{j-1}{}^{2}$ are respectively represented by complementary signal pairs $F_j{}^{+1}$, $\bar{F}_j{}^{+1}$; $F_{j-1}{}^{-2}$, $\bar{F}_{j-1}{}^{-2}$; and $C_{j-1}{}^{2}$, $\bar{C}_{j-1}{}^{2}$; where a bar (‾) over a symbol of a signal indicates the complement of the signal represented by the symbol; and wherein said third means includes four logical "and" circuits and one logical "or" circuit electrically connected to produce said signal series $R_j$, said logical "and" and "or" circuits being electrically connected according to the logical equation:

$$R_j=F_j^{+1}.\bar{F}_{j-1}^{-2}.\bar{C}_{j-1}^{2}+\bar{F}_j^{+1}.F_{j-1}^{-2}.\bar{C}_{j-1}^{2}$$
$$+\bar{F}_j^{+1}.\bar{F}_{j-1}^{-2}.C_{j-1}^{2}+F_j^{+1}.F_{j-1}^{-2}.C_{j-}^{2}$$

where a dot (.) and a plus (+) indicate a logical "and" and a logical "or" function, respectively.

18. An electronic arithmetic circuit synchronized by externally applied synchronizing pulses $Cp$ for adding a first and a secondary binary input number and for simultaneously subtracting therefrom a third binary input number to produce a corresponding binary result number, the first, the second, and the third binary input numbers being represented by a first, second, and third electrical input signal series $X_j$, $A_j$ and $B_j$, respectively, and the binary result number being represented by signal series $R_j$, the subscript $j$ indicating a binary digital place of the binary input numbers, said electronic arithmetic circuit comprising: first means responsive to the electrical input signal series for providing each electrical input signal of the $X_j$, $A_j$, and $B_j$ series with a significance of +1, +1, and −1, respectively, and for producing first and second intermediate signals $F_j{}^{+2}$ and $F_j{}^{-1}$, respectively, indicating the aggregate significance of the associated input signal, said first means including a first gate responsive to said electrical input signal series for producing said first intermediate signals $F_j{}^{+2}$, and a second gate responsive to said electrical input signal series for producing said second intermediate signals $F_j{}^{-1}$, said first and said second gating circuits each including at least one logical "and" and one logical "or" circuit; second means coupled to said first means and responsive to said first and second intermediate signals $F_j{}^{+2}$ and $F_j{}^{-1}$, for producing first and second carry signals $C_{j-1}{}^{+}$ and $C_{j-1}{}^{-}$, respectively, having a significance of +1 and −1, respectively, where the subscript $(j-1)$ indicates the occurrence of signals in the digital position next to the position indicated by the subscript $j$, said second means including a first circuit coupled to said first gate and responsive to said first intermediate signals $F_j{}^{+2}$ for delaying said first intermediate signals, thereby to produce signals $F_{j-1}{}^{+2}$ directly representative of said first carry signals $C_{j-1}{}^{+}$, and a second circuit coupled to said second gate and said first circuit and responsive to said second intermediate signals $F_j{}^{-1}$ and said first carry representing signals $F_{j-1}{}^{+2}$ for producing said second carry signals $C_{j-1}{}^{-}$; and third means coupled to said first and said second means and responsive to said second intermediate signals $F_j{}^{-1}$ and said second carry signals $C_{j-1}{}^{-}$ for producing signal series $R_j$ representing the binary result number.

19. The electronic arithmetic circuit defined in claim 18 wherein the electrical input signal series $X_j$, $A_j$, and $B_j$ are represented respectively by complementary pairs of binary signal series $X_j$, $\bar{X}_j$; $A_j$, $\bar{A}_j$; and $B_j$, $\bar{B}_j$; the bar (‾) over a symbol of a signal indicating the complement of the signal represented by the symbol; wherein said first gate includes two logical "and" circuits and two logical "or" circuits electrically coupled to produce said first intermediate signals $F_j{}^{+2}$, according to the following logical equation:

$$F_j{}^{+2}=X_j.(A_j+\bar{B}_j)+A_j.\bar{B}_j$$

and wherein said second gate includes four logical "and" circuits and one logical "or" circuit electrically coupled, to produce said second intermediate signals $F_j{}^{-1}$, according to the following logical equation:

$$F_j^{-1}=A_j.\bar{B}_j.\bar{X}_j+\bar{A}_j.B_j.\bar{X}_j+\bar{A}_j.\bar{B}_j.X_j+A_j.B_j.X_j$$

where a dot (.) or a parenthesis ( ) indicates a logical "and" function, and a plus (+) indicates a logical "or" function.

20. The electronic arithmetic circuit defined in claim 18 wherein said second intermediate signals $F_j{}^{-1}$ are represented by complementary pairs of binary signals $F_j{}^{-1}$ and $\bar{F}_j{}^{-1}$, a bar (‾) over a symbol of a signal indicating the complement of the signal; wherein said first circuit includes a first bistable flip-flop for receiving said first intermediate signals $F_j{}^{+2}$ and for producing complementary signals $F_{j-1}{}^{+2}$ and $\bar{F}_{j-1}{}^{+2}$ representing said first carry signals $C_{j-1}{}^{+}$; and wherein said second circuit includes a flip-flop control circuit coupled to said second gate and said first flip-flop and responsive to complementary signal pairs $F_{j-1}{}^{+2}$, $\bar{F}_{j-1}{}^{+2}$ and $F^{-1}$, $\bar{F}^{-1}$ for producing flip-flop control signals 1C(−) and 0C(−), and includes a second bistable flip-flop coupled to said flip-flop control circuit and having 1 and 0 input circuits responsive to flip-flop control signals 1C(−) and 0C(−), respectively, or producing a complementary pair of output signals $C_{j-1}{}^{-}$, $\bar{C}_{j-1}{}^{-}$ representing said second carry signals $C_{j-1}{}^{-}$.

21. The electronic arithmetic circuit defined in claim 20 wherein said flip-flop control circuit includes two logical "and" circuits electronically connected to produce said flip-flop control signals 1C(−) and 0C(−), said logical "and" circuits being electrically connected according to the logical Boolean equations:

$$1C(-)=F_j^{-1}.\bar{F}_{j-1}^{+2}.Cp$$

$$0C(-)=\bar{F}_j^{-1}.F_{j-1}^{+2}.Cp$$

where a dot (.) indicates a logical "and" function.

22. The electronic arithmetic circuit defined in claim 18 where said second intermediate signals $F_j{}^{-1}$, said first carry representing signals $F_{j-1}{}^{+2}$, and said second carry signals $C_{j-1}{}^{-}$ are respectively represented by complementary binary signal pairs $F_j{}^{-1}$, $\bar{F}_j{}^{-1}$; $F_{j-1}{}^{+2}$, $\bar{F}_{j-1}{}^{+2}$; and $C_{j-1}{}^{-}$, $C_{j-1}{}^{-}$; a bar (‾) over a symbol of a signal indicating the complement of the signal represented by the symbol, and wherein said third means includes four logical "and" circuits and one logical "or" circuit connected to produce signal series $R_j$, said logical "and" and "or" circuits being connected as indicated by the logical Boolean equation:

$$R_j=F_j^{-1}.\bar{F}_{j-1}^{+2}.\bar{C}_{j-1}^{-}+\bar{F}_j^{-1}.F_{j-1}^{+2}.\bar{C}_{j-1}^{-}$$
$$+\bar{F}_j^{-1}.\bar{F}_{j-1}^{+2}.C_{j-1}^{-}+F_j^{-1}.F_{j-1}^{+2}.C_{j-1}^{-}$$

where a dot (.) indicates a logical "and" function and a plus (+) a logical "or" function.

23. An electronic circuit synchronized by externally applied synchronizing pulses $Cp$ for adding a first and a second binary input number and for simultaneously subtracting therefrom a third and a fourth binary input number to produce a corresponding binary result number, the first, the second, the third, and the fourth binary input numbers being represented by binary input signal series $X_j$, $A_j$, $B_j$, and $Y_j$, respectively, and the binary result number being represented by a binary output signal series $F_j$, where the subscript $j$ indicates a binary digital place of the input numbers, each binary electrical signal of a series representing a binary digit of a corresponding binary number; said electronic circuit comprising: an evaluation circuit for receiving the binary input signal series and for providing each binary input signal of the $X_j$, $A_j$, $B_j$, and $Y_j$ series with respective values of +1, +1, −1, and −1, and for producing first and second evaluational signals $G_j^{-2}$ and $G_j^{+1}$, respectively, indicating the aggregate evaluation provided for the input signal series in accordance with a predetermined binary code wherein the first and the second evaluational signals $G_j^{-2}$ and $G_j^{+1}$ are evaluated as −2 and +1, respectively, said evaluational circuit including a first gating circuit responsive to each binary input signal series $A_j$, $B_j$, and $X_j$, for producing first and second sub-evaluational signals $F_j^{+2}$ and $F_j^{-1}$ representing values of +1 and −2, respectively, a delay circuit coupled to said first gating circuit and responsive to said first sub-evaluational signals $F_j^{+2}$, for delaying said signals, thereby to produce delayed first sub-evaluational signals $F_{j-1}^{+2}$, and a second gating circuit coupled to said first gating circuit and to said delay circuit and responsive to said second sub-evaluational signals $F_j^{-1}$, said delayed first sub-evaluational signals $F_{j-1}^{+2}$, and said binary input signal series $Y_j$ for producing said first and second evaluational signals $G_j^{-2}$ and $G_j^{+1}$ respectively, where the subscript $(j-1)$ indicates the occurrence of signals in the position next to the position indicated by the subscript $j$; a carry circuit coupled to said evaluational circuit and responsive to said first and second evaluational signals $G_j^{-2}$ and $G_j^{+1}$ for producing first and second carry signals $C_{j-1}^1$ and $C_{j-1}^2$, respectively, each having a value of −1, said carry circuit including a first portion coupled to said second gating circuit and responsive to said first evaluational signals $G_j^{-2}$ for delaying said evaluational signals for a period of time so as to produce signals $G_{j-1}^{-2}$ directly representing said first carry signals $C_{j-1}^1$, and said carry circuit including a second portion coupled to said first portion and to said second gating circuit and responsive to said first carry representing signals $G_{j-1}^{-2}$ and said second evaluational signals $G_j^{+1}$ for producing said second carry signals $C_{j-1}^2$; and an output circuit coupled to said evaluational circuit and said carry circuit and responsive to said second evaluational signal $G_j^{+1}$, said first carry representing signals $G_{j-1}^{-2}$, and said second carry signals $C_{j-1}^2$ for producing the binary output signal series $Rj$ representative of the desired binary result number.

24. The electronic circuit defined in claim 23 wherein the binary input signal series $X_j$, $A_j$, and $B_j$ are represented respectively by complementary binary input signal series $X_j$, $\bar{X}_j$; $A_j$, $\bar{A}_j$; and $B_j$, $\bar{B}_j$, where a bar (‾) over a symbol of a signal indicates the complement of the signal indicated by the symbol; and wherein said first gating circuit includes a first gate responsive to the complementary signal series $X_j$, $\bar{X}_j$; $A_j$, $\bar{A}_j$; $B_j$, $\bar{B}_j$; for producing said first sub-evaluational signals $F^{+2}$, and a second gate responsive to said complementary binary input signal series $X_j$, $\bar{X}_j$; $A_j$, $\bar{A}_j$; and $B_j$, $\bar{B}_j$, for producing said second sub-evaluational signals $F_j^{-1}$, said first gate and said second gate each including at least one logical "and" circuit and one logical "or" circuit.

25. The electronic circuit defined in claim 24 wherein said first gate includes two logical "and" circuits and two logical "or" circuits connected to produce said first sub-evaluational signals $F_j^{+2}$, said logical "and" and "or" circuits being connected in conformity with the logical Boolean equation:

$$F_j^{+2}=X_j.(A_j+\bar{B}_j)+A_j.\bar{B}_j$$

and wherein said second gate includes four logical "and" circuits and one logical "or" circuit connected to produce said second sub-evaluational signals $F_j^{-1}$, said logical "and" and "or" circuits being connected in conformity with the logical Boolean equation:

$$F_j^{-1}=A_j.\bar{B}_j.\bar{X}_j+\bar{A}_j.B_j.\bar{X}_j+\bar{A}_j.\bar{B}_j.X_j+A_j.B_j.X_j$$

where a dot (.) or a parenthesis ( ) indicates a logical "and" function, and where a plus indicates a logical "or" function.

26. The electronic circuit defined in claim 23 wherein said delay circuit includes a bistable flip-flop responsive to said first sub-evaluation signals $F_j^{+2}$ for producing said delay first sub-evaluational signals $F_{j-1}^{+2}$.

27. The electronic circuit defined in claim 23 wherein the input binary signal series $Y_j$, said second sub-evaluational signals $F_j^{-1}$, and said delayed first sub-evaluation signals $F_{j-1}^{+2}$ are represented each by complementary input binary signal pairs $Y_j$, $\bar{Y}_j$; $F_j^{-1}$, $\bar{F}_j^{-1}$; and $F_j^{+2}$, $\bar{F}_j^{+2}$, where a bar (‾) over a symbol of a signal indicates the complement of the signal indicated by the symbol; and wherein said second gating circuit includes a first gate coupled to said first gating circuit and said delay circuit and responsive to the complementary input binary signal pairs $F_j^{-1}$, $\bar{F}_j^{-1}$, and $F_{j-1}^{+2}$, $\bar{F}_{j-1}^{+2}$ for producing said first evaluational signals $G_j^{-2}$, and includes a second gate coupled to said first gating circuit and said delay circuit and responsive to the complementary input binary signal pairs $F_j^{-1}$, $\bar{F}_j^{-1}$, and $F_{j-1}^{+2}$, $\bar{F}_{j-1}^{+2}$ for producing said second evaluational signals $G_j^{+1}$, each of said first and said second gates having at least one logical "and" and one logical "or" circuit.

28. The electronic circuit defined in claim 27 wherein said first gate includes two logical "and" circuits and two logical "or" circuits electrically connected to produce said first evaluational signals $G_j^{-2}$, said logical "and" and "or" circuits being electrically connected in accordance with the logical Boolean equation:

$$G_j^{-2}=\bar{F}_{j-1}^{+2}.(F_j^{-1}+Y_j)+F_j^{-1}.Y_j$$

and wherein said second gate includes four logical "and" circuits and one logical "or" circuit electrically connected to produce said second evaluational signals $G_j^{+1}$, said logical "and" and "or" circuits being electrically connected in accordance with the logical Boolean equation:

$$G_j^{+1}=F_j^{-1}.\bar{F}_{j-1}^{+2}.\bar{Y}_j+\bar{F}_j^{-1}.F_{j-1}^{+2}.\bar{Y}_j+\bar{F}_j^{-1}.\bar{F}_{j-1}^{+2}.Y_j+F_j^{-1}.F_{j-1}^{+2}.Y_j$$

where a dot (·) and a parenthesis ( ) each represent a logical "and" function, and a plus (+) represents a logical "or" function.

29. The electronic circuit defined in claim 23 wherein said first portion includes a first bistable flip-flop coupled to said second gating circuit and responsive to said first evaluational signal $G_j^{-2}$ for producing complementary signal pairs $G_{j-1}^{-2}$, $\bar{G}_{j-1}^{-2}$ representing said first carry signals $C_{j-1}^1$.

30. The electronic circuit defined in claim 29 wherein said second section includes a flip-flop control circuit and a second bistable flip-flop, said flip-flop control circuit being coupled to said first portion and responsive to said complementary signal pairs $G_{j-1}^{-2}$, $\bar{G}_{j-1}^{-2}$ for producing first and second flip-flop control signals 1C2 and 0C2, respectively, and said second bistable flip-flop being coupled to sadi flip-flop control circuit and having 1 and 0 input circuits responsive respectively to said first and second flip-flop control signals 1C2 and 0C2 and for producing complementary output signals $C_{j-1}^2$ and $\bar{C}_{j-1}^2$ representing said second carry signals $C_{j-1}^2$.

31. The electronic circuit defined in claim 30 wherein said flip-flop control circuit includes two logical "and" circuits connected to produce said first and second flip-flop control signals 1C2 and 0C2, respectively, said logical "and" circuits being connected according to the following logical equations:

$$1C2=\bar{G}_j^{+1}.G_{j-1}^{-2}.Cp$$

$$0C2=G_j^{+1}.\bar{G}_{j-1}^{-2}.Cp$$

where a dot (·) indicates a logical "and" function.

32. The electronic circuit defined in claim 23 wherein said second evaluational signal $G_j^{+1}$, said first carry representing signals $G_{j-1}^{-2}$, and said second carry signals $C_{j-1}^{2}$ are each represented respectively by complementary signal pairs $G_j^{+1}$, $G_j^{+1}$; $G_{j-1}^{-2}$, $G_{j-1}^{-2}$; and $C_{j-1}^{2}$, $\bar{C}_{j-1}^{2}$– a bar (‾) over a symbol of a signal indicating the complement of the signal represented by the symbol; and wherein said output circuit includes four logical "and" circuits and one logical "or" circuit connected to produce the binary output signal series $R_j$ in accordance with the logical function:

$$R_j = G_j^{+1}.\overline{G}_{j-1}^{-2}.\overline{C}_{j-1}^{2} + \overline{G}_j^{+1}.G_{j-1}^{-2}.\overline{C}_{i-1}^{2} + \overline{G}_j^{+1}.\overline{G}_{j-1}^{-2}.C_{i-1}^{2} + G_j^{+1}.G_{j-1}^{-2}.C_{j-1}^{2}$$

where a dot (·) and a plus (+) in the above function indicates a logical "and" and a logical "or" function, respectively.

33. An electronic arithmetic circuit for simultaneously receiving M and N binary input numbers and for summing the M binary input numbers and for subtracting the N binary input numbers from the sum of the M binary input numbers, thereby to produce a corresponding binary result number, where $(M+N)$ is an integer greater than 2, and M and N are each an integer not lest than 1, the M and the N binary input members being respectively represented by M and N corresponding series of binary electrical input signals, and the binary result number being represented by a series of electrical output signals; said electronic arithmetic unit comprising: a translation circuit responsive to the M and N binary electrical input signals for providing each input signal of the M and N input signal series with a significance of +1 and −1, respectively, and for producing intermediate signals indicating the total significance of the input signal series; a carry circuit coupled to said first translation circuit and responsive to said intermediate signals for producing carry signals; and a logical output gate coupled to said translation circuit and said carry circuit and responsive to said intermediate signals and said carry signals for producing the electrical output signal series representative of the desired binary result number.

References Cited in the file of this patent

UNITED STATES PATENTS 2,812,903 Knutsen ---------------- Nov. 12, 1957

OTHER REFERENCES

Progress Report #2 on the Edvac, Univ. of Penna., Fig. PYO-108, February 1947.

Synthesis of Electronic Computing and Control Circuits, Harvard University Press, 1951; pages 164–165 relied on.

"Serial Digital Adders for a Variable Radix of Notation," by Townsend, Electronic Engineering, October 1953, pages 410–416.

UNITED STATES PATENT OFFICE
Certificate of Correction

Patent No. 2,888,202 — May 26, 1959

John V. Blankenbaker et al.

It is hereby certified that error appears in the printed specification of the above numbered patent requiring correction and that the said Letters Patent should read as corrected below.

Column 14, line 27, the left-hand portion of the equation should read as shown below instead of as in the patent:

$$toF(-2)j-1=[\overline{X}_j$$

line 61, after the semicolon, strike out:

$$F_j^{1,3}, F_{j-1}^{-2}, C_{j-1}^{2}$$

column 22, line 36, in the equation, after "$(A_j$" insert — + —; column 23, line 40, after "said" insert —second—; column 24, line 71, for $C_{j-1}^{-2}$ and $\overline{C}_{j-1}^{-2}$ read $C_{j-1}^{2}$ and $\overline{C}_{j-1}^{2}$ column 25, line 28, for "secondary" read —second—; column 26, line 26, for $F^{-1}, \overline{F}^{-1}$ read $F_j^{-1}, \overline{F}_j^{-1}$ line 50, for $C_{j-1}^{-}, C_{j-1}^{-}$; read $C_{j-1}^{-}, \overline{C}_{j-1}^{-}$;

line 72, for "$F_j$" read —$R_j$—; column 27, line 13, for "+1 and −2" read — +2 and −1 —; line 54, for $F^{+2}$ read —$F_j^{+2}$— column 29, line 2, for $G_j^{+1}$, second occurrence, read $\overline{G}_j^{+2}$ same line 2, for $G_{j-1}^{-2}$, second occurrence, read $\overline{G}_{j-1}^{-2}$ Signed and sealed this 29th day of March 1960.

[SEAL]

Attest:
KARL H. AXLINE,
*Attesting Officer.*

ROBERT C. WATSON,
*Commissioner of Patents.*